United States Patent
Ying et al.

(10) Patent No.: US 10,805,916 B2
(45) Date of Patent: Oct. 13, 2020

(54) PROCEDURE, USER EQUIPMENT AND BASE STATION FOR CODE BLOCK GROUP BASED HYBRID AUTOMATIC REPEAT REQUEST PROCESS

(71) Applicants: Sharp Laboratories of America, Inc., Vancouver, WA (US); FG Innovation Company Limited, Tuen Mun (HK)

(72) Inventors: Kai Ying, Vancouver, WA (US); Tatsushi Aiba, Vancouver, WA (US); Zhanping Yin, Vancouver, WA (US); Toshizo Nogami, Chiba (JP); John Michael Kowalski, Vancouver, WA (US)

(73) Assignees: Sharp Laboratories of America, Inc., Vancouver, WA (US); FG Innovation Company Limited, Tuen Mun (HK)

( * ) Notice: Subject to any disclaimer, the term of this patent is extended or adjusted under 35 U.S.C. 154(b) by 10 days.

(21) Appl. No.: 16/190,536

(22) Filed: Nov. 14, 2018

(65) Prior Publication Data
US 2019/0150122 A1    May 16, 2019

Related U.S. Application Data

(63) Continuation of application No. PCT/US2018/060764, filed on Nov. 13, 2018.
(Continued)

(51) Int. Cl.
*H04L 1/18* (2006.01)
*H04W 72/04* (2009.01)
(Continued)

(52) U.S. Cl.
CPC ......... *H04W 72/042* (2013.01); *H04L 1/1861* (2013.01); *H04L 5/0053* (2013.01);
(Continued)

(58) Field of Classification Search
CPC ... H04W 72/04; H04W 72/14; H04W 72/042; H04L 1/18; H04L 5/00; H04L 5/0055; H04L 1/1861
See application file for complete search history.

(56) References Cited

U.S. PATENT DOCUMENTS

2018/0145797 A1* 5/2018 Yeo .................. H04L 1/1812
2018/0278368 A1* 9/2018 Kim .................. H04L 1/0048
(Continued)

FOREIGN PATENT DOCUMENTS

| CN | 107222298 A | 9/2017 |
| WO | 2016126330 A1 | 8/2016 |

OTHER PUBLICATIONS

3GPP TR 38.913 V0.3.0, "Study on Scenarios and Requirements for Next Generation Access Technologies (Release 14)," Mar. 2016.
3GPP TR 22.862 V1.0.0, "Feasibility Study on New Services and Markets Technology Enablers Critical Communications; Stage 1 (Release 14)," Feb. 2016.
(Continued)

*Primary Examiner* — Chi Ho A Lee
(74) *Attorney, Agent, or Firm* — ScienBiziP, P.C.

(57) ABSTRACT

A user equipment (UE) is described. The UE includes receiving circuitry. The receiving circuitry is configured to receive a Radio Resource Control (RRC) message including first information configuring code block group (CBG) based (re)transmission and a maximum number of CBGs. The receiving circuitry may also be configured to receive a Radio Resource Control (RRC) message including second information configuring HARQ-ACK bundling for the CBGs within a TB and a number of bundled HARQ-ACK information bits per TB.

2 Claims, 34 Drawing Sheets

CBG HARQ-ACK multiplexing of TB 0 and TB 1

CBG which is not decoded successfully

Related U.S. Application Data

(60) Provisional application No. 62/586,799, filed on Nov. 15, 2017.

(51) Int. Cl.
  *H04W 72/14* (2009.01)
  *H04L 5/00* (2006.01)

(52) U.S. Cl.
  CPC ............ *H04W 72/14* (2013.01); *H04L 5/001* (2013.01); *H04L 5/0055* (2013.01)

(56) References Cited

U.S. PATENT DOCUMENTS

| | | | |
|---|---|---|---|
| 2018/0332568 A1* | 11/2018 | Wu | H04W 72/042 |
| 2018/0367259 A1* | 12/2018 | Hsieh | H04L 1/0041 |
| 2019/0036654 A1* | 1/2019 | Kim | H04L 1/1812 |
| 2019/0191486 A1* | 6/2019 | Myung | H04L 1/1896 |
| 2019/0191487 A1* | 6/2019 | Kwon | H04L 1/00 |
| 2019/0207734 A1* | 7/2019 | Yang | H04L 1/0061 |
| 2019/0335536 A1* | 10/2019 | Kwon | H04L 1/00 |
| 2020/0022137 A1* | 1/2020 | Xiao | H04L 5/0055 |

OTHER PUBLICATIONS

Huawei, HiSilicon, "Overview of URLLC support in NR", 3GPP TSG RAN WG1 meeting #86bis, Lisbon, Portugal, R1-1608843, Oct. 14, 2016.

"RAN1 Chairman's Notes," 3GPP TSG RAN WG1 Meeting #86bis, Lisbon, Portugal Oct. 14, 2016.

3GPP TS 36.331, V14.0.0, Evolved Universal Terrestrial Radio Access (E-UTRA); Radio Resource Control (RRC); Protocol specification (Release 14) Sep. 2016.

3GPP TS 36.321, V14.0.0, Evolved Universal Terrestrial Radio Access (E-UTRA); Medium Access Control (MAC); Protocol specification (Release 14) Sep. 2016.

3GPP TS 38.213, V1.1.1, 3rd Generation Partnership Project; Technical Specification Group Radio Access Network; NR; Physical layer procedures for control (Release 15) Nov. 2017.

ZTE, "Summary Email discussion on: CBG based retransmission, Transmission/retransmission of preempted data before/after ACK NACK feedback, Preemption indication for NR", 3GPP TSG RAN WG1 Meeting #89, Hangzhou, China, R1-1709148, May 19, 2017.

International Search Report and Written Opinion issued for PCT Application No. PCT/US2018/060764 dated Jan. 18, 2019.

Verma, S., "3GPP NR U-Plane Introduction," Industrial Technology Research Institute, online publication, retrieved from the internet: URL: http://std-share.itri.org.tw/Content/Files/Event/Files/3.3GPP%20NR%U-plane%20introduction_CCY.pdf; pp. 1-56 Aug. 12, 2017.

* cited by examiner

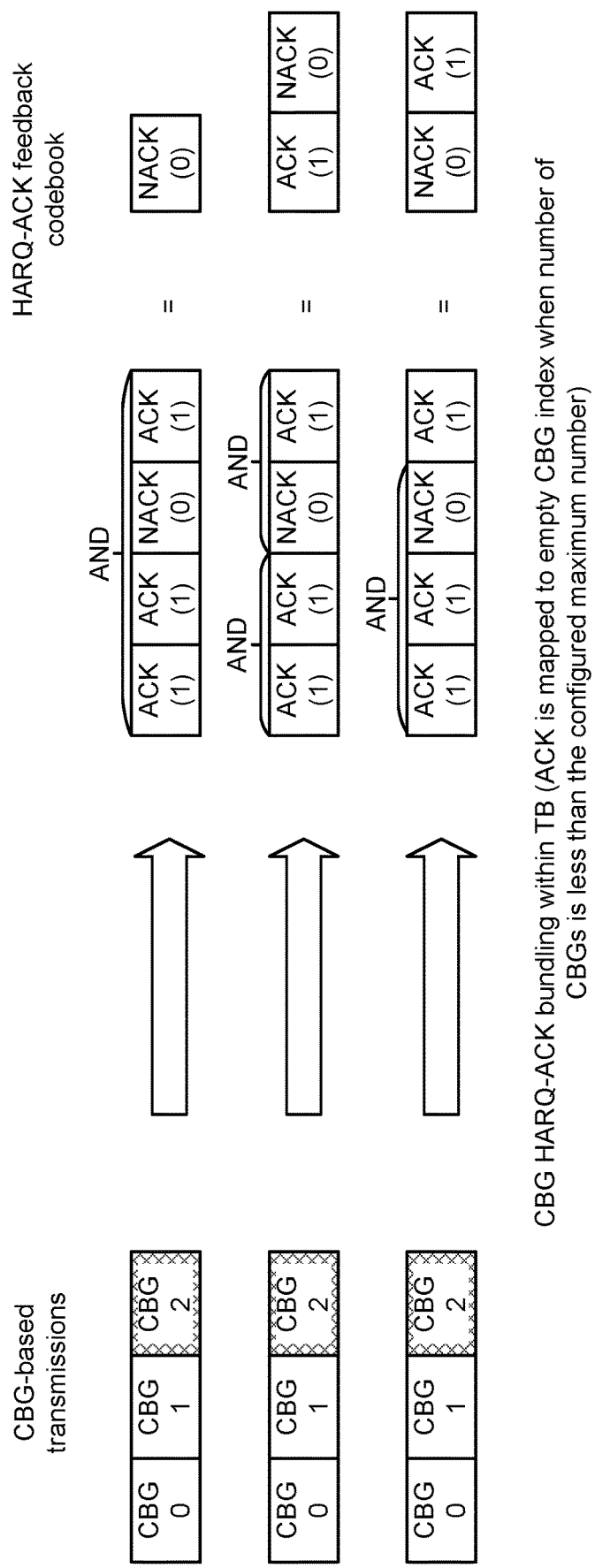
FIG. 3C
 CBG which is not decoded successfully

PROCEDURE, USER EQUIPMENT AND BASE STATION FOR CODE BLOCK GROUP BASED HYBRID AUTOMATIC REPEAT REQUEST PROCESS

RELATED APPLICATIONS

This application is related to and claims priority from U.S. Provisional Patent Application No. 62/586,799, entitled "PROCEDURE, USER EQUIPMENT AND BASE STATION FOR CODE BLOCK GROUP BASED HYBRID AUTOMATIC REPEAT REQUEST PROCESS," filed on Nov. 15, 2017, which is hereby incorporated by reference herein, in its entirety.

TECHNICAL FIELD

The present disclosure relates generally to communication systems. More specifically, the present disclosure relates to procedures, user equipment and base stations for code block group (CBG)-based hybrid automatic repeat request process (HARQ).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIGS. 3A-3D illustrate examples of CBG HARQ-ACK bundling;

DETAILED DESCRIPTION

Figure 1:
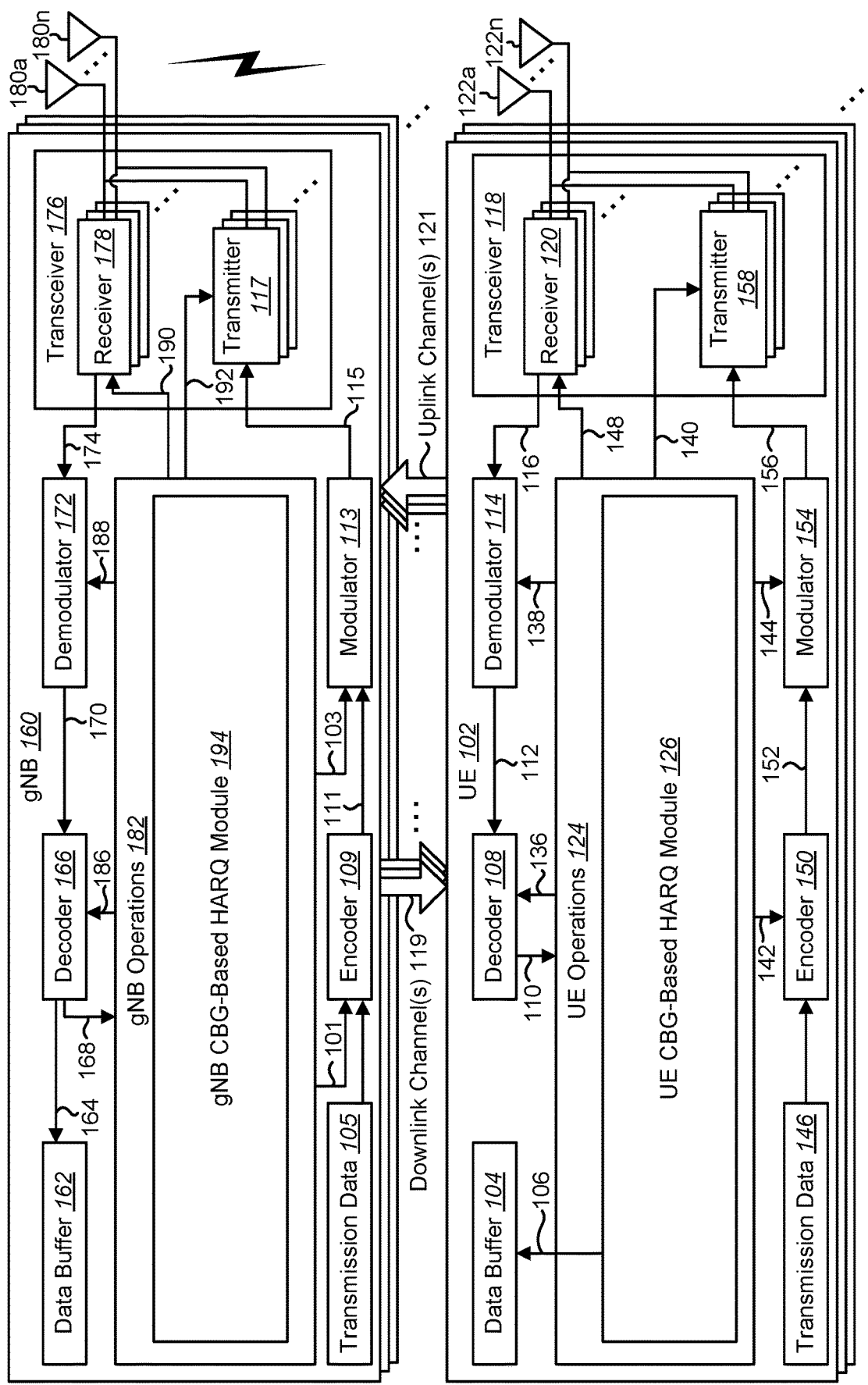
FIG. 1 is a block diagram illustrating one implementation of one or more base stations (gNBs) and one or more user equipments (UEs) in which systems and methods for code block groups (CBG)-based HARQ-ACK processes may be implemented.

A user equipment (UE) is described. The UE includes receiving circuitry. The receiving circuitry is configured to receive a Radio Resource Control (RRC) message including first information configuring code block group (CBG) based (re)transmission and a maximum number of CBGs.

The receiving circuitry may also be configured to receive a Radio Resource Control (RRC) message including second information configuring HARQ-ACK bundling for the CBGs within a transport block (TB) and a number of bundled HARQ-ACK information bits per TB.

The receiving circuitry may be further configured to receive on a PDCCH resource, a scheduling downlink control information (DCI) message, including third information configuring time-domain information (e.g., slot offset), frequency-domain information (e.g., resource block index), and a code block group (CBG) transmission information for a physical downlink shared channel (PDSCH) resource of a CBG-based transmission. The receiving circuitry may be additionally configured to receive on the PDSCH resource, a corresponding CB G-based transmission.

The UE may also include a transmitting circuitry configured to send on a PUCCH resource, bundled HARQ-ACK information bit(s) according the second information indicating whether/which group of bundled CBGs of a corresponding transmission are decoded successfully or not.

The receiving circuitry may be further configured to receive a Radio Resource Control (RRC) message including second information configuring HARQ-ACK bundling for the CBGs across TBs. The receiving circuitry may be further configured to receive on a PDCCH resource, a scheduling downlink control information (DCI) message, including third information configuring time-domain information (e.g., slot offset), frequency-domain information (e.g., resource block index), and a code block group (CBG) transmission information for a physical downlink shared channel (PDSCH) resource of a CBG-based transmission. The receiving circuitry may be additionally configured to receive on the PDSCH resource, a corresponding CBG-based transmission.

The UE may also include a transmitting circuitry configured to send on a PUCCH resource, a bundled HARQ-ACK information bit for a CBG index indicating whether the CBG(s) with the same index in any TBs or both TBs in the PDSCH are decoded successfully or not.

A base station apparatus is also described. The base station apparatus includes a transmitting circuitry configured to transmit a Radio Resource Control (RRC) message including first information configuring code block group (CBG) based retransmission and a maximum number of CBGs.

The transmitting circuitry may be further configured to transmit a Radio Resource Control (RRC) message including second information configuring HARQ-ACK bundling for the CBGs within a TB and a number of bundled HARQ-ACK information bits per TB. The transmitting circuitry may be additionally configured to transmit on a PDCCH resource, a scheduling downlink control information (DCI) message, including third information configuring time-domain information (e.g., slot offset), frequency-domain information (e.g., resource block index), and a code block group (CBG) transmission information for a physical downlink shared channel (PDSCH) resource of a CBG-based transmission. The transmitting circuitry may be further configured to transmit on the PDSCH resource, a corresponding CBG-based transmission.

The base station apparatus may also include a receiving circuitry configured to receive on a PUCCH resource, bundled HARQ-ACK information bit(s) according to the second information indicating whether/which group of bundled CBGs of a corresponding transmission are decoded successfully or not.

The transmitting circuitry may be further configured to transmit a Radio Resource Control (RRC) message including second information configuring HARQ-ACK bundling for the CBGs across TBs. The transmitting circuitry may be additionally configured to transmit on a PDCCH resource, a scheduling downlink control information (DCI) message, including third information configuring time-domain information (e.g., slot offset), frequency-domain information (e.g., resource block index), and a code block group (CBG) transmission information for a physical downlink shared channel (PDSCH) resource of a CBG-based transmission. The transmitting circuitry may be further configured to transmit on the PDSCH resource, a corresponding CBG-based transmission.

The base station apparatus may also include a receiving circuitry configured to receive on a PUCCH resource, a bundled HARQ-ACK information bit for a CBG index indicating whether the CBG(s) with the same index in any TBs or both TBs in the PDSCH are decoded successfully or not.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the PDCCH. It should be noted that a "cell" may be described in terms of differing dimensions. For example, a "cell" may have temporal, spatial (e.g., geographical) and frequency characteristics.

Fifth generation cellular communications, dubbed "New Radio" or "NW" by 3GPP envisions the use of time, frequency and/or space resources to allow for enhanced Mobile Broadband Communication (eMBB) and Ultra Reliable Low Latency (URLL) communication services, as well as massive Machine Type Communication (MMTC)-like services. In order for the services to use the time/frequency/space medium efficiently it would be useful to be able to flexibly schedule services on the medium so that the medium may be used as effectively as possible, given the conflicting needs of URLLC, eMBB, and MMTC.

Currently, latency issues are addressed in LTE largely via scheduling and prioritization of transmissions. There are no real flexible uses of the medium outside of scheduling for MTC and delay tolerant services, although the Narrowband Internet of Things ("NBIoT") extensions to LTE employ a specific set of time/frequency resources.

Moreover, there is little standardized information passed between different eNBs today that would enable such services to efficiently coexist. Means have been proposed to enable services to coexist together. However, only a minimum of details have been provided.

In general, a transmission may be preempted by another transmission due to the latency requirement. A preemption indication may be required to help reception and decoding. On the other hand, a transport block (TB) may be grouped into multiple code block groups (CBGs). In the case that some CBGs are not decoded successfully, there may be no need to retransmit the whole TB. Instead, only impacted CBGs may be scheduled for retransmission. This disclosure teaches how to handle CBG-based transmission and hybrid automatic repeat request process (HARQ).

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for CBG-based HARQ-ACK processes may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)) and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel) and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE CBG-based HARQ module 126.

Procedures and signaling for CBG-based transmission and Hybrid Automatic Repeat Request Process (HARQ) are described herein. A transport block (TB) may be divided into one or more code block(s) (CBs). Channel coding may be performed per CB, and CRC bits may be attached to each CB. With a configuration of CBG-based transmission and/or retransmission, CBs may be further grouped into multiple CB groups (CBG). The UE 102 may generate multiple HARQ-ACK information bits through a one-to-one mapping with the multiple CBGs. The UE 102 may generate an ACK for each CBG that the UE 102 correctly decoded in current transmission or a previous transmission of the transport block.

On the other hand, the UE 102 may generate HARQ-ACK feedbacks for multiple transmissions at the same time by using the same format/resource. Each transmission may or may not be CBG-based.

Multiple TBs may require HARQ-ACK feedbacks simultaneously by using same format and/or resource. These TBs may be categorized as follows. The TBs may be from different layers (spatial domain). In this case, the PDSCH can include two transport blocks. The TBs may be from different component carriers (CCs). The TBs may be from different bandwidth parts (BWPs). The TBs may be from different slots or mini-slots (i.e., time domain). The TBs may also be any combination of the categories above.

Different ways to generate HARQ-ACK feedbacks for multiple TBs are described herein. A first approach includes HARQ-ACK multiplexing. In one implementation, the HARQ-ACK multiplexing may include a CBG-level HARQ-ACK codebook. One approach to the CBG-level HARQ-ACK codebook includes a semi-static CBG-level HARQ-ACK codebook. For each TB configured with CBG-based (re)transmission, the number of HARQ-ACK information bits may be semi-statically configured or fixed. NACK (or ACK) may be mapped for the empty CBG index if the actual number of CBGs for a TB is smaller than the configured maximum number of CBGs (HARQ-ACK information bits).

Another approach to the CBG-level HARQ-ACK codebook includes a dynamic CBG-level HARQ-ACK codebook. For each TB configured with CBG-based (re)transmission, the number of HARQ-ACK information bits may be dynamically adjusted. For example, the number of HARQ-ACK information bits for each TB may be equal to the actual number of CBGs in the TB.

In another implementation, the HARQ-ACK multiplexing may include a TB-level HARQ-ACK codebook. One approach to the TB-level HARQ-ACK codebook includes a semi-static TB-level HARQ-ACK codebook. The number of TBs requiring simultaneous HARQ-ACK feedback may be semi-statically configured or fixed. The UE 102 may generate HARQ-ACK information bits for these TBs no matter whether any of these TBs are not scheduled or detected. For example, NACK (or ACK) may be mapped to the TB index if this TB is not scheduled.

Another approach to the TB-level HARQ-ACK codebook includes a dynamic TB-level HARQ-ACK codebook. The number of TBs requiring simultaneous HARQ-ACK feedback may be dynamically changed. The UE 102 may generate HARQ-ACK information bits only for the TBs which are scheduled.

In yet another implementation of HARQ-ACK multiplexing, any combination of a CBG-level HARQ-ACK codebook and/or TB-level HARQ-ACK codebook may be used. Some examples of HARQ-ACK multiplexing are described in connection with FIGS. 2A-2E.

A second approach to generating HARQ-ACK feedbacks for multiple TBs includes HARQ-ACK bundling. To save information bits, HARQ-ACK information bits for different CBGs and/or TBs may be combined by AND operation. One implementation includes CBG HARQ-ACK bundling within TB. In this case, any CBG HARQ-ACK information bits within a TB may be combined by AND operation.

Another implementation of HARQ-ACK bundling includes CBG HARQ-ACK bundling across TBs. A CBG HARQ-ACK information bit of a TB may be combined with a CBG HARQ-ACK information bit of another TB. Any combination of the HARQ-ACK bundling described above may be implemented. Some examples of CBG HARQ-ACK bundling are described in connection if FIGS. 3A-3D.

Details of CBG HARQ-ACK bundling are also described herein. Examples of CBG HARQ-ACK bundling usages may include one or more of the following. In a first approach, CBG HARQ-ACK feedback may be used for TBs in different layers. The PDSCH may include two transport blocks. An example of this approach is described in connection with FIGS. 4A-4E.

In a second approach, CBG HARQ-ACK feedback may be for TBs in different component carriers. An example of this approach is described in connection with FIGS. 5A-5E.

In a third approach, CBG HARQ-ACK feedback may be for TBs in different bandwidth parts. An example of this approach is described in connection with FIGS. 6A-6E.

In a fourth approach, CBG HARQ-ACK feedback may be for TBs at different slots. An example of this approach is described in connection with FIGS. 7A-7E.

In a fifth approach, CBG HARQ-ACK feedback may be for any combination of the above approaches.

Downlink control information and/or RRC configuration to support CBG HARQ-ACK bundling are also described herein. A first aspect includes CBG HARQ-ACK bundling within TB. In this case, there may be a parameter CBG_HARQ_bundling_TB (or CBG_HARQ_bundling_TB0 and CBG_HARQ_bundling_TB1 for two TBs included in a PDSCH) indicating whether CBG HARQ-ACK bundling is applied within this TB or not. This parameter may be indicated by PDCCH (DCI) and/or configured by RRC.

There may not be an explicit parameter to indicate whether CBG HARQ-ACK bundling is applied within a TB or not. CBG HARQ-ACK bundling may be conditionally applied. For example, if the actual number of CBGs in the TB is less than the configured maximum number of CBGs minus T (T may be fixed, configured by RRC, or indicated by PDCCH (DCI) or MAC CE, for instance), then CBG HARQ-ACK bundling may be applied.

If CBG HARQ-ACK bundling is applied, which is indicated explicitly or implicitly as above, ACK may be mapped (assumed) for the empty CBG index if the actual number of CBGs for a TB is smaller than the configured maximum number of CBGs (e.g., HARQ-ACK information bits) before the AND operation (for generating bundled HARQ-ACK information bit(s)).

A second aspect includes CBG HARQ-ACK bundling across TBs. In this case, there may be a parameter CBG_HARQ_bundling_across_TB (or CBG_HARQ_bundling_across_CC, CBG_HARQ_bundling_across_BWP, and CBG_HARQ_bundling_across_slot, for instance) indicating whether CBG HARQ-ACK bundling is applied between or among TBs or not. This parameter may be indicated by PDCCH (DCI) and/or configured by RRC. CBG HARQ-ACK bundling across TBs may only be applied to two TBs within a PDSCH. In yet another design, CBG HARQ-ACK bundling across TBs may also be applied to TBs from different CCs, BWPs and/or slots. In yet another design, CBG HARQ-ACK bundling across TBs may be applied to TBs using the same layer(s) but different CCs, BWPs and/or slots.

If CBG HARQ-ACK bundling across TBs is applied, which is indicated explicitly or implicitly as above, ACK may be mapped (assumed) for the empty CBG index if the actual number of CBGs for a TB is smaller than the configured maximum number of CBGs (e.g., HARQ-ACK information bits) before the AND operation (for generating bundled HARQ-ACK information bit(s)).

Downlink assignment indicator (DAI) to support CBG HARQ-ACK bundling is also described herein. One aspect includes CBG HARQ-ACK bundling within TB. In this case, the UE 102 may need to know the number of HARQ-ACK information bits after bundling and/or which CBG HARQ-ACK information bits can be combined. A DAI field (or two DAIs for two TBs included in a PDSCH) in a scheduling DCI can indicate the information. For example, "00" in the DAI field indicates that no bundling is applied for this TB; "01" in the DAI field indicates that every two consecutive CBG HARQ-ACK information bits are combined by AND operation; "10" in the DAI field indicates that every four consecutive CBG HARQ-ACK information bits are combined by AND operation; and "11" in the DAI field indicates that all the CBG HARQ-ACK information bits are combined in one bit by AND operation. Here, in the described systems and methods, the name "DAI" is used as an example. However, the specification may use a different name (e.g., HARQ-ACK bits indicator).

Another aspect of DAI to support CBG HARQ-ACK bundling includes CBG HARQ-ACK bundling across TBs (e.g., PDSCHs). In this case, the UE 102 may need to know the number of TBs requiring CBG HARQ-ACK bundling. A total DAI in a DCI can be used to indicate the number of TBs requiring HARQ-ACK bundling and a counter DAI can be used to indicated the TB index. Through the total DAI and the counter DAI, the UE 102 can know which TB may be scheduled but not detected.

There can be different ways to design the UE behavior if the UE 102 knows one or more TBs may be scheduled but not detected. In a first design, the UE 102 generates all NACK for the CBG HARQ-ACK information bits. In a second design, the UE 102 fallbacks to TB HARQ-ACK feedback (e.g., TB HARQ-ACK information bits, HARQ-ACK information bit(s) for PDSCH that includes TB, HARQ-ACK information bits(s) for only TB, one bit HARQ-ACK information for the transport block) to indicate which TB is received successfully and which are not detected or decoded successfully. In a first method of the second design, the UE 102 may use different PUCCH resource/format to indicate TB HARQ-ACK feedback. In a second method of the second design, the UE 102 may use the same PUCCH resource and/or format to indicate TB HARQ-ACK feedback and an additional bit may be used to indicate the different interpretation of the same PUCCH resource/format.

Details of dynamic TB-level HARQ-ACK multiplexing and/or CBG-level HARQ-ACK multiplexing are also described herein. A downlink assignment indicator (DAI) may be used to support dynamic CBG-level HARQ-ACK multiplexing and/or dynamic TB-level HARQ-ACK multiplexing. HARQ-ACK multiplexing may be applied to two TBs included in a PDSCH and/or different TBs from different PDSCHs. In this case, in the scheduling DCI for a PDSCH, there may be a first DAI indicating the number of CBGs in a first TB in the PDSCH or the number of CBG HARQ-ACK information bits required for the first TB, a second DAI indicating the number of CBGs in a second TB in the PDSCH or the number of CBG HARQ-ACK information bits required for the second TB, a counter DAI indicating the counted number of CBGs or the counted number of CBG HARQ-ACK information bits for this PDSCH and other PDSCHs which are already counted in, and a total DAI indicating the total/final number of CBGs or the total/final number of CBG HARQ-ACK information bits, which require HARQ-ACK multiplexing (i.e., codebook size).

If a UE is configured (e.g., per serving cell) with a higher layer parameter (e.g., CBG-DL=ON), the UE 102 may receive PDSCHs that include code block groups (CBGs) of a transport block. A UE 102 may not be expected to be configured with the higher layer parameter (e.g., CBG-DL) for a PDSCH reception scheduled by DCI format (e.g., FB-fallback) when the UE 102 transmits HARQ-ACK information only for the transport block in the PDSCH reception.

If the UE 102 is configured by higher layer parameter (e.g., CBG-DL=ON), the UE 102 may be configured by higher layer parameter (e.g., CBGs_per_TB) (per serving cell, for instance) a maximum number $N_{HARQ\text{-}ACK}^{CBG/TB,max} \in \{2\ 4\ 6, 8\}$ of CBGs for generating respective HARQ-ACK information bits for a transport block reception when the PDSCH includes one transport block or a maximum number $N_{HARQ\text{-}ACK}^{CBG/TB,max}\{1, 2, 3, 4\}$ of CBGs for generating respective HARQ-ACK information per transport block reception when the PDSCH can include two transport blocks.

For a number of C code blocks (CBs) in the transport block, the UE 102 may determine a number of CBGs as $N_{HARQ\text{-}ACK}^{CBG/TB}=\min(N_{HARQ\text{-}ACK}^{CBG/TB,max},C)$. Each of the first $N_{HARQ\text{-}ACK}^{CBG/TB,1}=\mod(C,N_{HARQ\text{-}ACK}^{CBG/TB})$ CBGs may include $\lceil C/N_{HARQ\text{-}ACK}^{CBG/TB}\rceil$ CBs, where CBG $n_{CBG}$, $0 \leq n_{CBG} < N_{HARQ\text{-}ACK}^{CBG/TB,1}$, includes CBs $n_{CBG} \cdot \lceil C/N_{HARQ\text{-}ACK}^{CBG/TB}\rceil + n_{CB}$, $0 \leq n_{CB} < \lceil C/N_{HARQ\text{-}ACK}^{CBG/TB}\rceil$, and each of the last $N_{HARQ\text{-}ACK}^{CBG/TB,2}=N_{HARQ\text{-}ACK}^{CBG/TB}-\mod(C,N_{HARQ\text{-}ACK}^{CBG/TB})$ CBGs includes $\lfloor C/N_{HARQ\text{-}ACK}^{CBG/TB}\rfloor$ CBs, where CBG $n_{CBG}$, $N_{HARQ\text{-}ACK}^{CBG/TB,1} \leq n_{CBG} < N_{HARQ\text{-}ACK}^{CBG/TB,1}+N_{HARQ\text{-}ACK}^{CBG/TB,2}$, includes CBs $N_{HARQ\text{-}ACK}^{CBG/TB,1} \cdot \lceil C/N_{HARQ\text{-}ACK}^{CBG/TB}\rceil+(n_{CBG}-N_{HARQ\text{-}ACK}^{CBG/TB,1}) \cdot \lfloor C/N_{HARQ\text{-}ACK}^{CBG/TB}\rfloor+n_{CB}$, $0 \leq n_{CB} < \lfloor C/N_{HARQ\text{-}ACK}^{CBG/TB}\rfloor$. The UE 102 may generate $N_{HARQ\text{-}ACK}^{CBG/TB,1}+N_{HARQ\text{-}ACK}^{CBG/TB,2}$ HARQ-ACK information bits through a one-to-one mapping with the $N_{HARQ\text{-}ACK}^{CBG/TB,1}+N_{HARQ\text{-}ACK}^{CBG/TB,2}$ CBGs.

A retransmission of a transport block to a UE 102, corresponding to a same HARQ process as a previous transmission of the transport block to the UE 102, may include the same CBs in a CBG as the initial transmission of the transport block.

If a DCI format scheduling the retransmission of the transport block includes a CBG transmission indication (CBGTI) field of $N_{HARQ\text{-}ACK}^{CBG/TB,max}$ bits, where the first $N_{HARQ\text{-}ACK}^{CBG/TB}$ bits of the CBGTI field have a one-to-one mapping with the $N_{HARQ\text{-}ACK}^{CBG/TB}$ CBGs, the UE 102 may determine whether or not a CBG is retransmitted based on a corresponding value of the CBGTI field.

If a UE 102 is configured with a higher layer parameter (e.g., codebooksizeDetermination=cc), the HARQ-ACK codebook may include the $N_{HARQ\text{-}ACK}^{CBG/TB,max}$ HARQ-ACK information bits. If $N_{HARQ\text{-}ACK}^{CBG/TB} < N_{HARQ\text{-}ACK}^{CBG/TB,max}$, the UE 102 may set to a NACK value the last $N_{HARQ\text{-}ACK}^{CBG/TB,max}-N_{HARQ\text{-}ACK}^{CBG/TB}$ HARQ-ACK information bits in the HARQ-ACK codebook.

If the UE 102 generates a HARQ-ACK codebook in response to a retransmission of a transport block, corresponding to a same HARQ process as a previous transmission of the transport block, the UE 102 may generate an ACK for each CBG that the UE 102 correctly decoded in a previous transmission of the transport block.

If a UE 102 correctly detects each of the $N_{HARQ\text{-}ACK}^{CBG/TB}$ CBGs and does not correctly detect the transport block for the $N_{HARQ\text{-}ACK}^{CBG/TB}$ CBGs, the UE 102 may report a NACK value for each of the $N_{HARQ\text{-}ACK}^{CBG/TB}$ CBGs.

If a UE 102 is indicated/configured with a parameter (e.g., CBG-Bundling=ON), which may be configured by RRC and/or indicated by L1 signaling (PDCCH, DCI) or MAC CE, the UE 102 may generate one or more combined/bundled HARQ-ACK information bits by applying AND operation(s) (i.e., logical AND operation(s), binary AND operation(s)) to the $N_{HARQ\text{-}ACK}^{CBG/TB,max}$ (or the first $N_{HARQ\text{-}ACK}^{CBG/TB}$) CBG HARQ-ACK information bits for a transport block reception when the PDSCH includes one transport block or per transport block reception when the PDSCH can include two transport blocks. Namely, the bundling is applied to the HARQ-ACK information bits (i.e., CBG HARQ-ACK information bits, HARQ-ACK information bits for PDSCH that includes CBG (i.e., PDSCH transmission that includes CBG)).

If a UE 102 is indicated/configured by parameter (e.g., HARQ-ACK_bits_per TB) (per serving cell, for instance) a number $N_{HARQ-ACK}^{CBG/TB,bundle}$ of bundled bits for generating respective bundled HARQ-ACK information bits for a transport block reception when the PDSCH includes one transport block or per transport block reception when the PDSCH can include two transport blocks. The parameter may be configured by RRC, indicated by L1 signaling (PDCCH, DCI) or MAC CE, or any combination above (a set of values is configured by RRC and the choice is indicated by L1 signaling, PDCCH, DCI). In yet another design, the parameter may be indicated/configured separately for each transport block reception when the PDSCH can include two transport blocks.

The UE 102 may divide the first $N_{HARQ-ACK}^{CBG/TB}$ CBG HARQ-ACK information bits for one TB reception or per TB reception into $N_{HARQ-ACK}^{CBG/TB,bundle}$ groups (which is referred as bundling groups), and generate one bundled HARQ-ACK information bit for each group by applying AND operation to the HARQ-ACK information bits in each group. For example, every consecutive $\lceil N_{HARQ-ACK}^{CBG/TB,bundle} \rceil$ HARQ-ACK information bits forms a group and the last group may contain equal or less than $\lceil N_{HARQ-ACK}^{CBG/TB}/N_{HARQ-ACK}^{CBG/TB,bundle} \rceil$ HARQ-ACK information bits. The UE 102 may generate $N_{HARQ-ACK}^{CBG/TB,bundle}$ bundled HARQ-ACK information bits through a one-to-one mapping with the $N_{HARQ-ACK}^{CBG/TB,bundle}$ groups. In yet another example, each of the first $N_{HARQ-ACK}^{CBG/TB,bundle,1}$=mod $(N_{HARQ-ACK}^{CBG/TB}, N_{HARQ-ACK}^{CBG/TB,bundle})$ groups may include $\lceil N_{HARQ-ACK}^{CBG/TB}/N_{HARQ-ACK}^{CBG/TB,bundle} \rceil$ HARQ-ACK information bits, where bundled CBG HARQ-ACK information bit group $n_{CBG,bundle}$, $0 \leq n_{CBG,bundle} < N_{HARQ-ACK}^{CBG/TB,bundle,1}$, includes CBG HARQ-ACK information bit(s) with index $n_{CBG,bundle} \cdot \lceil N_{HARQ-ACK}^{CBG/TB}/N_{HARQ-ACK}^{CBG/TB,bundle} \rceil + n_{CBG\_index}$, $0 \leq$, and each of the $n_{CBG\_index} < \lceil N_{HARQ-ACK}^{CBG/TB}/N_{HARQ-ACK}^{CBG/TB,bundle} \rceil$ last $N_{HARQ-ACK}^{CBG/TB,bundle,2} = N_{HARQ-ACK}^{CBG/TB,bundle}$-mod $(N_{HARQ-ACK}^{CBG/TB}, N_{HARQ-ACK}^{CBG/TB,bundle})$ groups includes $\lfloor N_{HARQ-ACK}^{CBG/TB}/N_{HARQ-ACK}^{CBG/TB,bundle} \rfloor$ CBG HARQ-ACK information bits, where bundled CBG HARQ-ACK information bit group $n_{CBG,bundle}$, $N_{HARQ-ACK}^{CBG,bundle,1} \leq n_{CBG,bundle} <$, includes CBG HARQ-ACK includes CBG HARQ-ACK $N_{HARQ-ACK}^{CBG/TB,bundle,1} + N_{HARQ-ACK}^{CBG/TB,bundle,2}$ information bit(s) with index $N_{HARQ-ACK}^{CBG/TB,bundle,1}$. $\lceil N_{HARQ-ACK}^{CBG/TB}/N_{HARQ-ACK}^{CBG/TB,bundle} \rceil + (n_{CBG,bundle} - N_{HARQ-ACK}^{CBG/TB,bundle,1}) \cdot \lfloor N_{HARQ-ACK}^{CBG/TB}/N_{HARQ-ACK}^{CBG/TB,bundle} \rfloor + n_{CBG\_index}$, $0 \leq n_{CBG\_index} < \lfloor N_{HARQ-ACK}^{CBG/TB}/N_{HARQ-ACK}^{CBG/TB,bundle} \rfloor$ The UE 102 may generate $N_{HARQ-ACK}^{CBG/TB,bundle,1} + N_{HARQ-ACK}^{CBG/TB,bundle,2}$ bundled HARQ-ACK information bits through a one-to-one mapping with the $N_{HARQ-ACK}^{CBG/TB,bundle1} + N_{HARQ-ACK}^{CBG/TB,bundle,2}$ groups.

In yet another example, each of the first $N_{HARQ-ACK}^{CBG/TB,bundle,1} = N_{HARQ-ACK}^{CBG/TB,bundle}$-mod $(N_{HARQ-ACK}^{CBG/TB}, N_{HARQ-ACK}^{CBG/TB,bundle})$ groups groups may include $\lfloor N_{HARQ-ACK}^{CBG/TB}/N_{HARQ-ACK}^{CBG/TB,bundle} \rfloor$ HARQ-ACK information bits, where bundled CBG HARQ-ACK information bit group $n_{CBG,bundle}$, $0 \leq n_{CBG,bundle} < N_{HARQ-ACK}^{CBG/TB,bundle,1}$, includes CBG HARQ-ACK information bit(s) with index $n_{CBG,bundle} \cdot \lfloor N_{HARQ-ACK}^{CBG/TB}/N_{HARQ-ACK}^{CBG/TB,bundle} \rfloor +$ $n_{CBG\_index}$, $0 \leq$, while each of the $n_{CBG\_index} < \lfloor N_{HARQ-ACK}^{CBG/TB,bundle} \rfloor$ last $N_{HARQ-ACK}^{CBG/TB,bundle,2} = \text{mod}(N_{HARQ-ACK}^{CBG/TB},$ $N_{HARQ-ACK}^{CBG/TB,bundle})$ groups includes $\lceil N_{HARQ-ACK}^{CBG/TB}/N_{HARQ-ACK}^{CGB/TB,bundle} \rceil$ CBG HARQ-ACK information bits, where bundled CBG HARQ-ACK information bit group $n_{CBG,bundle}$, $N_{HARQ-ACK}^{CBG/TB,bundle,1} \leq n_{CBG.bundle} < N_{HARQ-ACK}^{CBG/TB,bundle,1} + N_{HARQ-ACK}^{CBG/TB,bundle,2}$, includes CBG HARQ-ACK information bit(s) with index $N_{HARQ-ACK}^{CBG/TB,bundle,1} \cdot \lfloor N_{HARQ-ACK}^{CBG/TB}/ N_{HARQ-ACK}^{CBG/TB,bundle} \rfloor + (n_{CBG,bundle} - N_{HARQ-ACK}^{CBG/TB,bundle,1}) \cdot \lceil N_{HARQ-ACK}^{CBG/TB}/N_{HARQ-ACK}^{CBG/TB,bundle} \rceil +$. The UE 102 $n_{CBG\_index}$, $0 \leq n_{CBG\_index} < \lceil N_{HARQ-ACK}^{CBG/TB}/N_{HARQ-ACK}^{CBG/TB,bundle} \rceil$ may generate $N_{HARQ-ACK}^{CBG/TB,bundle,1} + N_{HARQ-ACK}^{CBG/TB,bundle,2}$ bundled HARQ-ACK information bits through a one-to-one mapping with the $N_{HARQ-ACK}^{CBG/TB,bundle,1} + N_{HARQ-ACK}^{CBG/TB,bundle,2}$ groups.

In yet another design, the UE 102 may divide the $N_{HARQ-ACK}^{CBG/TB,max}$ CBG HARQ-ACK information bits for one TB reception or per TB reception into $N_{HARQ-ACK}^{CBG/TB,bundle}$ groups. If $N_{HARQ-ACK}^{CBG/TB,max}$, the UE 102 may assume ACK value for the last $N_{HARQ-ACK}^{CBG/TB,max} - N_{HARQ-ACK}^{CBG/TB}$ (i.e., empty index) HARQ-ACK information bits. Then the UE 102 may generate one bundled HARQ-ACK information bit for each group by applying AND operation to the HARQ-ACK information bits in each group. For example, every consecutive $\lceil N_{HARQ-ACK}^{CBG/TB,max}/N_{HARQ-ACK}^{CBG/TB,bundle} \rceil$ HARQ-ACK information bits forms a group and the last group may contain equal or less than $\lceil N_{HARQ-ACK}^{CBG/TB,max}/N_{HARQ-ACK}^{CBG/TB, bundle} \rceil$ HARQ-ACK information bits. The UE 102 may generate $N_{HARQ-ACK}^{CBG/TB,bundle}$ bundled HARQ-ACK information bits through a one-to-one mapping with the $N_{HARQ-ACK}^{CBG/TB,bundle}$ groups.

In yet another example, each of the first $N_{HARQ-ACK}^{CBG/TB,bundle,1} = \text{mod}(N_{HARQ-ACK}^{CBG/TB,max}, N_{HARQ-ACK}^{CBG/TB,bundle})$ groups may include $\lceil N_{HARQ-ACK}^{CBG/TB,max}/N_{HARQ-ACK}^{CBG/TB,bundle} \rceil$ HARQ-ACK information bits, where bundled CBG HARQ-ACK information bit group $n_{CBG,bundle}$, $0 \leq n_{CBG,bundle} < N_{HARQ-ACK}^{CBG/TB,bundle,1}$, includes CBG HARQ-ACK information bit(s) with index $n_{CBG,bundle} \cdot \lceil N_{HARQ-ACK}^{CBG/TB,max}/N_{HARQ-ACK}^{CBG/TB,bundle} \rceil +$ $n_{CBG\_index}$, $0 \leq$, and each of the $n_{CBG\_index} < \lceil N_{HARQ-ACK}^{CBG/TB,max}/N_{HARQ-ACK}^{CBG/TB,bundle} \rceil$ last $N_{HARQ-ACK}^{CBG/TB,bundle,2} = N_{HARQ-ACK}^{CBG/TB,bundle}$-mod $(N_{HARQ-ACK}^{CBG/TB,max}, N_{HARQ-ACK}^{CBG/TB,bundle})$ groups includes $\lfloor N_{HARQ-ACK}^{CBT/TB,max}/N_{HARQ-ACK}^{CBG/TB,bundle} \rfloor$ HARQ-ACK information bits, where bundled CBG HARQ-ACK information bit group $n_{CBG,bundle}$, $N_{HARQ-ACK}^{CBG/TB,bundle1} \leq n_{CBG,bundle} <$, includes CBG HARQ-ACK $N_{HARQ-ACK}^{CBG/TB,bundle,1} +$ $N_{HARQ-ACK/TB,bundle,2}$ information bit(s) with index $N_{HARQ-ACK}^{CBG/TB,bundle,1} \cdot \lceil N_{HARQ-ACK}^{CBG/TB,max} \rceil$ $N_{HARQ-ACK}^{CBG/TB,bundle} + (n_{CBG,bundle} - N_{HARQ-ACK}^{CBG/TB,bundle,1}) \cdot \lfloor N_{HARQ-ACK}^{CBG/TB,bundle} \rfloor +$. The UE 102 $n_{CBG\_index}$, $0 \leq n_{CBG\_index} < \lfloor N_{HARQ-ACK}^{CBG/TB,bundle} \rfloor$ may generate $N_{HARQ-ACK}^{CGB/TB,bundle,1} +$ $N_{HARQ-ACK}^{CBG/TB,bundle,2}$ bundled HARQ-ACK information bits through a one-to-one mapping with the $N_{HARQ-ACK}^{CBG/TB,bundle1} + N_{HARQ-ACK/TB,bundle,2}$ groups.

In yet another example, each of the first $N_{HARQ-ACK}^{CBG/TB,bundle,1} = N_{HARQ-ACK}^{CBG/TB,bundle}$-mod $(N_{HARQ-ACK}^{CBG/TB,max}, N_{HARQ-ACK}^{CBG/TB,bundle})$ groups may include $\lfloor N_{HARQ-ACK}^{CBG/TB,max}/ N_{HARQ-ACK}^{CBG/TB,bundle} \rfloor$ HARQ-ACK information bits, where bundled CBG HARQ-ACK information bit group $n_{CBG,bundle}$, $0 \leq n_{CBG,bundle} < N_{HARQ-ACK/CBG/TB,bundle,1}$, includes CBG HARQ-ACK information bit(s) with index $n_{CBG,bundle} \cdot \lfloor N_{HARQ-ACK}^{CBG/TB,max} / N_{HARQ-ACK}^{CBG/TB,bundle} \rfloor + n_{CBG\_index}$, $0 \leq$, while each of the $n_{CBG\_index} < \lfloor N_{HARQ-ACK}^{CBG/TB,max} / N_{HARQ-ACK}^{CBG/TB,bundle} \rfloor$ last $N_{HARQ-ACK}^{CBG/TB,bundle,2} = \mod(N_{HARQ-ACK}^{CBG/TB,max}, N_{HARQ-ACK}^{CBG/TB,bundle})$ groups includes $\lceil N_{HARQ-ACK}^{CBG/TB,max} / N_{HARQ-ACK}^{CBG/TB,bundle} \rceil$ CB HARQ-ACK information bits, where bundled CBG HARQ-ACK information bit group $n_{CBG,bundle}$, $N_{HARQ-ACK}^{CBG/TB,bundle,1} \leq n_{CBG,bundle} <$, includes CBG HARQ-ACK $N_{HARQ-ACK}^{CGB/TB,bundle,1} + N_{HARQ-ACK}^{CBG/TB,bundle,2}$ information bit(s) with index $N_{HARQ-ACK}^{CBG/TB,bundle,1} \cdot N_{HARQ-ACK}^{CBG/TB,max} / N_{HARQ-ACK}^{CBG/TB,bundle} \rfloor + (n_{CBG,bundle} - N_{HARQ-ACK}^{CBG/TB,bundle,1}) \cdot \lceil N_{HARQ-ACK}^{CBG/TB,max} / N_{HARQ-ACK}^{CBG/TB,bundle} \rceil +$. The UE 102 $n_{CBG\_index}$, $0 \leq n_{CBC\_index} < \lceil N_{HARQ-ACK}^{CBG/TB,max} / N_{HARQ-ACK}^{CBG/TB,bundle} \rceil$ may generate $N_{HARQ-ACK}^{CBG/TB,bundle,1} + N_{HARQ-ACK}^{CBG/TB,bundle,2}$ bundled HARQ-ACK information bits through a one-to-one mapping with the $N_{HARQ-ACK}^{CBG/TB,bundle,1} + N_{HARQ-AC}^{CBG/TB,bundle,2}$ groups.

If a UE 102 is indicated/configured by parameter (e.g., HARQ-ACK_bits_for bundling) (per serving cell, for instance) a number $N_{HARQ-ACK}^{CBGforbundling}$ of HARQ-ACK information bits for generating one bundled HARQ-ACK information bits. The parameter may be configured by RRC, indicated by L1 signaling (PDCCH, DCI) or MAC CE, or any combination above (a set of values is configured by RRC and the choice is indicated by L1 signaling, PDCCH, DCI). The parameter may be indicated/configured commonly or separately for each transport block reception when the PDSCH includes two transport blocks.

The UE 102 may divide the first $N_{HARQ-ACK}^{CBG/TB}$ CBG HARQ-ACK information bits for one TB reception or per TB reception into $\lceil N_{HARQ-ACK}^{CBG/TB} / N_{HARQ-ACK}^{CBGforbundling} \rceil$ groups, and generate one bundled HARQ-ACK information bit for each group by applying AND operation to the HARQ-ACK information bits in each group. For example, every consecutive $N_{HARQ-ACK}^{CBGforbundling}$ HARQ-ACK information bits forms a group and the last group may contain equal or less than $N_{HARQ-ACK}^{CBGforbundling}$ HARQ-ACK information bits. The UE 102 may generate $\lceil N_{HARQ-ACK}^{CBG/TB} / N_{HARQ-ACK}^{CGBforbundling} \rceil$ bundled HARQ-ACK information bits through a one-to-one mapping with the $\lceil N_{HARQ-ACK}^{CBG/TB} / N_{HARQ-ACK}^{CBGforbundling} \rceil$ groups.

In yet another design, the UE 102 may divide the $N_{HARQ-ACK}^{CBG/TB} / N_{HARQ-ACK}^{CBG/TB,max}$ CBG HARQ-ACK information bits for one TB reception or per TB reception into $\lceil N_{HARQ-ACK}^{CBG/TB,max} / N_{HARQ-ACK}^{CBGforbundling} \rceil$ groups. If $N_{HARQ-ACK}^{CBG/TB} < N_{HARQ-ACK}^{CBG/TB,max}$, the UE 102 may assume ACK value for the last $N_{HARQ-ACK}^{CBG/TB,max} - N_{HARQ-ACK}^{CBG/TB}$ (i.e., empty index) HARQ-ACK information bits. Then the UE 102 may generate one bundled HARQ-ACK information bit for each group by applying AND operation to the HARQ-ACK information bits in each group. For example, every consecutive $N_{HARQ-ACK}^{CBGforbundling}$ HARQ-ACK information bits forms a group and the last group may contain equal or less than $N_{HARQ-ACK}^{CBGforbundling}$ HARQ-ACK information bits. The UE 102 may generate $\lceil N_{HARQ-ACK}^{CBG/TB,max} / N_{HARQ-ACK}^{CBGforbundling} \rceil$ bundled HARQ-ACK information bits through a one-to-one mapping with the $\lceil N_{HARQ-ACK}^{CBG/TB,max} / N_{HARQ-ACK}^{CBGforbundling} \rceil$ groups.

A UE 102 may apply bundling to a HARQ-ACK codebook in response to a retransmission of a transport block, corresponding to a same HARQ process as a previous transmission of the transport block. One or some CBGs may be scheduled in the retransmission of the transport block. HARQ-ACK bundling may not only consider the HARQ-ACK information bit for the scheduled CBGs but also the CBGs which may not be scheduled in this retransmission. Namely, the retransmission (e.g., the retransmission of the transport block, the retransmission of the previous transmission (e.g., the initial transmission)) may be identified by the HARQ process. Also, the retransmission of the previous transmission may be indicated by using downlink control information (e.g., a new data indicator field) included in the DCI format (i.e., the DCI).

In a design, the UE 102 may assume ACK for the HARQ-ACK feedback information bits of the non-scheduled CBGs in this retransmission, and then apply bundling to the codebook by using the methods mentioned above and generate the respective bundled HARQ-ACK information bits.

For example, in a case that the parameter [CBG-Bundling, HARQ-ACK_bits_per_TB and/or CBG-Bundling-across-TB] is configured, the UE 102 may assume ACK (an ACK value) for each of the non-scheduled CBG(s), and apply the bundling to generate HARQ-ACK information bit(s). Namely, in a case that the parameter [CBG-Bundling, HARQ-ACK_bits_per_TB and/or CBG-Bundling-across-TB] is configured, if $N_{HARQ-ACK}^{CBG/TB} < N_{HARQ-ACK}^{CBG/TB,max}$ and/or one or more CBGs are not scheduled in the PDSCH, the UE 102 may assume ACK(s) for each of the corresponding CBG(s) (i.e., each of HARQ-ACK information bit(s) for non-scheduled and/or empty CBG(s)). And, the UE 102 may perform the bundling operation(s) (as described in this invention) for each of information bit(s) (i.e., HARQ-ACK information bit(s) for CBGs (all CBGs) with index $n_{CBG}$, $0 \leq n_{CBG} < N_{HARQ-ACK}^{CBG/TB,max}$) to generate bundled HARQ-ACK information bit(s). Here, HARQ-ACK information bits of empty CBG(s) may include the last $N_{HARQ-ACK}^{CBG/TB,max} - N_{HARQ-ACK}^{CBG/TB}$ HARQ-ACK information bits for the corresponding TB if $N_{HARQ-ACK}^{CBG/TB} < N_{HARQ-ACK}^{CBG/TB,max}$.

In yet another design, UE 102 may ignore the HARQ-ACK feedback information bits of the non-scheduled CBGs in this retransmission. UE may not change the grouping method as mentioned above and then apply AND operation to each bundling group without taking into account the HARQ-ACK feedback information bits of the non-scheduled CBGs. If none of the CBGs in a bundling group is scheduled in this retransmission, either NACK or ACK can be generated for this bundled HARQ-ACK information bit.

In yet another design, UE 102 may ignore the HARQ-ACK feedback information bits of the non-scheduled CBGs in this retransmission. But, UE may apply the grouping method as mentioned only to the HARQ-ACK feedback information bits of the scheduled CBGs. For example, the UE 102 may divide the $N_{HARQ-ACK}^{CBG/TB,scheduled}$ CBG HARQ-ACK information bits for one TB reception or per TB reception into $N_{HARQ-ACK}^{CBG/TB,bundle}$ groups where $N_{HARQ-ACK}^{CBG/TB,scheduled}$ in this retransmission.

If a UE 102 is indicated/configured with a parameter (e.g., CBG-Bundling-across-TB=ON), which may be configured by RRC and/or indicated by L1 signaling (PDCCH, DCI) or MAC CE, the UE 102 may generate one combined/bundled HARQ-ACK information bits by applying logic or binary AND operation(s) to a CBG HARQ information bit of a TB and a CBG HARQ information (with the same index) of another TB included in the same PDSCH. In other words, the bundled CBG HARQ-ACK information bits equal binary AND operation of the CBG HARQ-ACK bits corresponding to the first and second codewords (or TBs) of this cell (or PDSCH). For example, $O_{CBG,bundle}(n_{CBG}) = O_{CBG,1}(n_{CBG}) + O_{CBG,2}(n_{CBG})$, $0 \leq n_{CBG} < N_{HARQ-ACK}^{CBG/TB,max}$, where $O_{CBG,bundle}(n_{CBG}), O_{CBG,1}(n_{CBG}), O_{CBG,2}(n_{CBG})$ are bundled CBG HARQ-ACK information bit, CBG HARQ-ACK information bit of the first codeword (TB), CBG HARQ-ACK information bit of the second codeword (TB), respectively, for the CBG with the same index $n_{CBG}$.

If the number of CBG is less than the configured number $N_{HARQ-ACK}^{CBG/TB,max}$, or one or more CBGs are not scheduled in this PDSCH, the UE 102 may assume ACK for these non-scheduled CBGs and/or empty CBGs (the last $N_{HARQ-ACK}^{CBG/TB,max} - N_{HARQ-ACK}^{CBG/TB}$ HARQ-ACK information bits for the corresponding TB if $N_{HARQ-ACK}^{CBG/TB} < N_{HARQ-ACK}^{CBG/TB,max}$) and then generate bundled CBG HARQ-ACK information bit by applying binary AND operation of the CBG HARQ-ACK bits corresponding to the first and second codewords (or TBs) of this cell (or PDSCH) as mentioned above. In yet another design, the UE 102 may ignore the CBG HARQ-ACK information bits for these non-scheduled CBGs and/or empty CBGs (the last $N_{HARQ-ACK}^{CBG/TB} - N_{HARQ-ACK}^{CBG/TB}$ HARQ-ACK information bits for the corresponding TB if $N_{HARQ-ACK}^{CBG/TB} < N_{HARQ-ACK}^{CBG/TB,max}$), and then generate bundled CBG HARQ-ACK information bit by applying binary AND operation of the CBG HARQ-ACK bits corresponding to the first and second codewords (or TBs) of this cell (or PDSCH) as mentioned above. If both CBGs with index $n_{CBG}$ in the two TBs (codewords) are empty and/or not scheduled, either ACK or NACK may be used for the corresponding CBG HARQ-ACK information bit.

The index for CBG, TB, codeword, HARQ-ACK information bit, and other groupings mentioned above may be indexed from 0, 1 or any other number. Bit "0" may be used to indicate NACK and "1" may be used to indicate ACK. In a different design, bit "0" may be used to indicate ACK and "1" may be used to indicate NACK.

If a UE 102 is configured with a higher layer parameter (e.g., CBG-DL=OFF), the UE 102 may generate one HARQ-ACK information bit per transport block.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB CBG-based HARQ module 194. The gNB CBG-based transmission HARQ 194 may perform CBG-based HARQ processes as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the gNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2A:
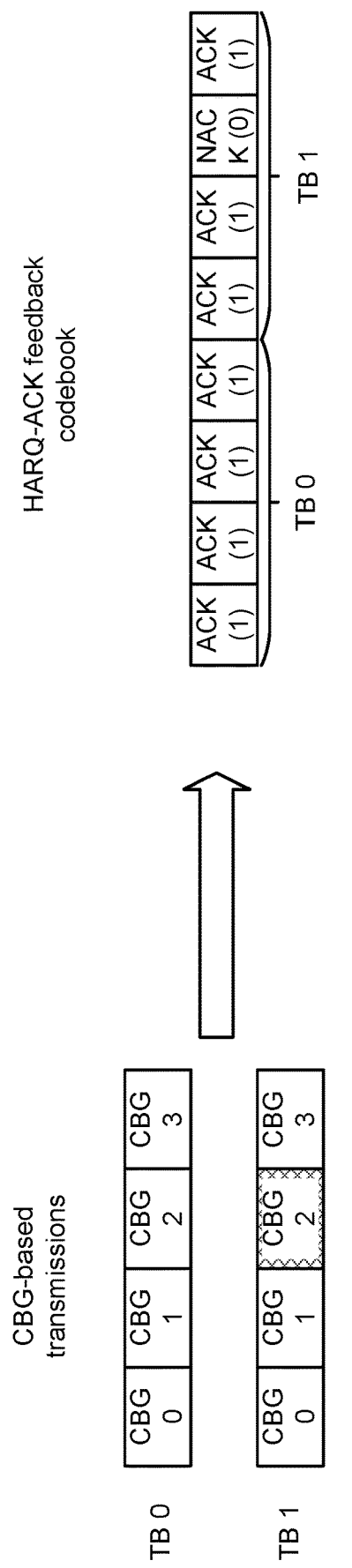
FIGS. 2A-2E illustrate examples of CBG HARQ-ACK multiplexing for multiple transport block (TBs)

FIGS. 2A-2E illustrate examples of code block groups (CBG) HARQ-ACK multiplexing for multiple transport block (TBs). In these examples, CBG-based transmissions are depicted with a corresponding HARQ-ACK feedback codebook. FIG. 2A is an example of CBG HARQ-ACK multiplexing of TB 0 and TB 1. In this example, the third CBG of TB 1 is not decoded correctly. NACK is mapped to the corresponding HARQ-ACK feedback codebook.

Figure 2B:
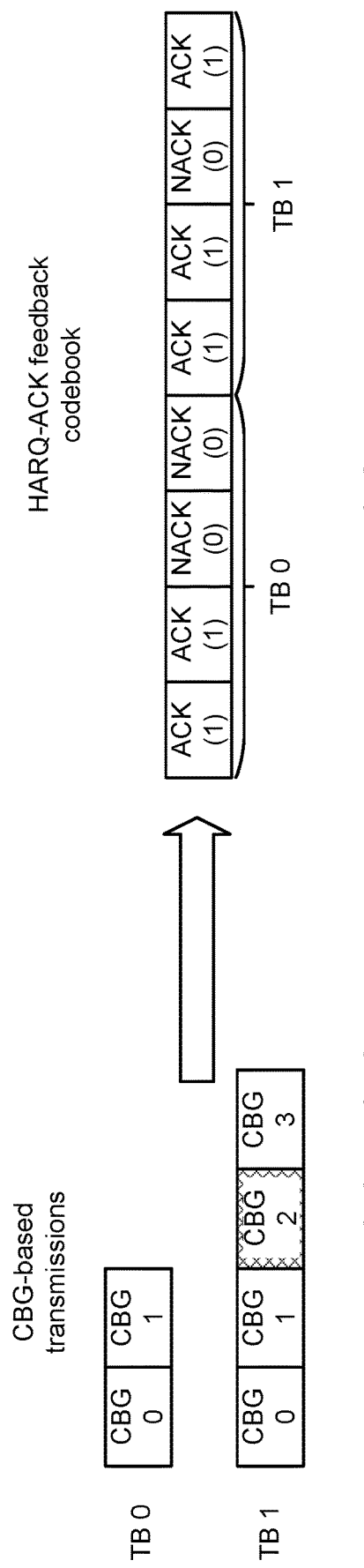

In FIG. 2B, a CBG HARQ-ACK multiplexing of TB 0 and TB 1 is shown with a semi-static CBG-level codebook. In this example, the third CBG of TB 1 is not decoded correctly. NACK is mapped to the corresponding HARQ-ACK feedback codebook. Furthermore, NACK is mapped to the empty CBG index of TB 0.

Figure 2C:
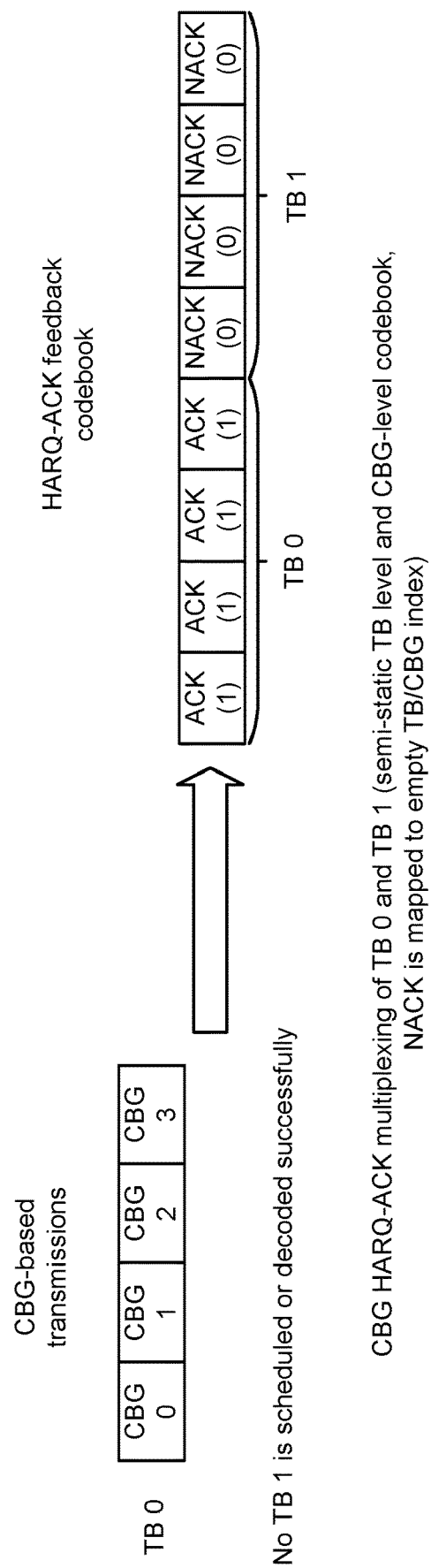

In FIG. 2C, a CBG HARQ-ACK multiplexing of TB 0 and TB 1 is shown with a semi-static TB level and CBG-level codebook. In this example, no TB 1 is scheduled or decoded successfully. The NACK for TB 1 is mapped to the empty TB/CBG index.

Figure 2D:
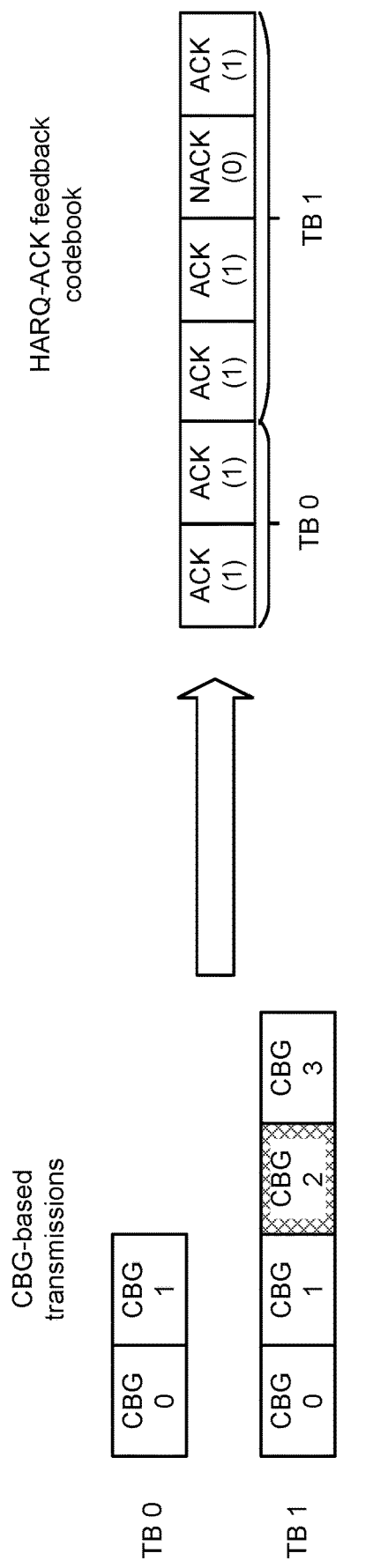

In FIG. 2D, a CBG HARQ-ACK multiplexing of TB 0 and TB 1 is shown with a dynamic CBG-level codebook.

Figure 2E:
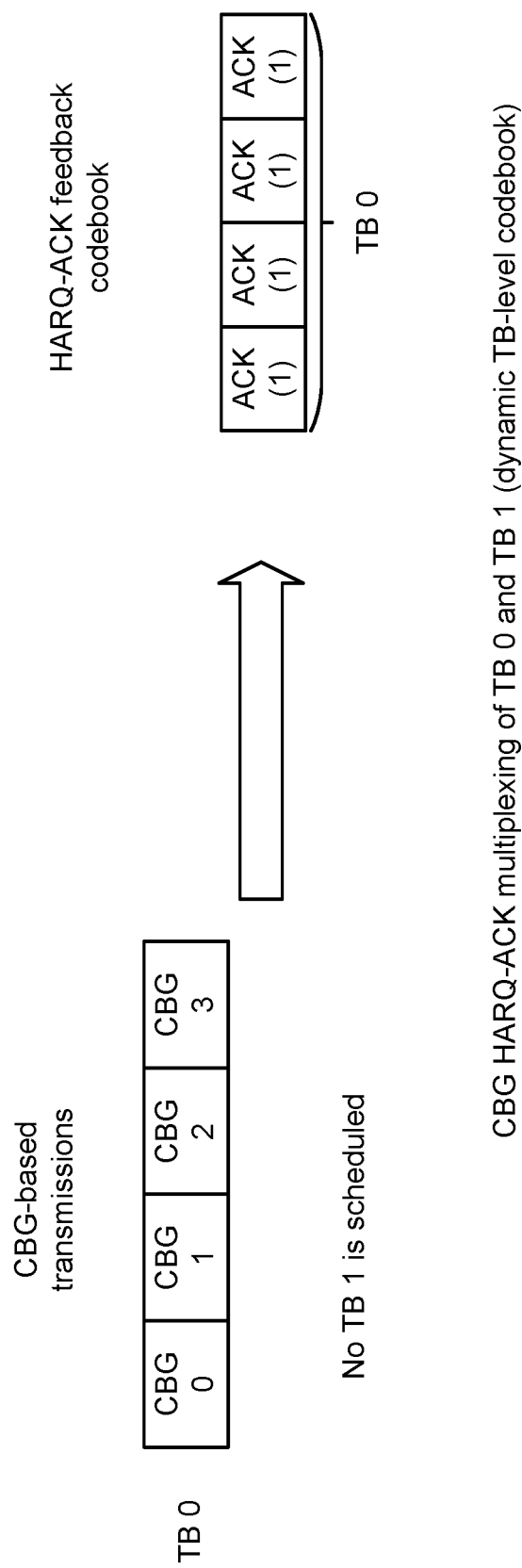

In FIG. 2E, a CBG HARQ-ACK multiplexing of TB 0 and TB 1 is shown with a dynamic TB-level codebook. In this example, no TB 1 is scheduled. The HARQ-ACK feedback codebook includes ACK for the TB 0.

FIGS. 3A-3D illustrate examples of CBG HARQ-ACK bundling. In these examples, CBG-based transmissions are depicted with a corresponding HARQ-ACK feedback codebook.

Figure 3A:
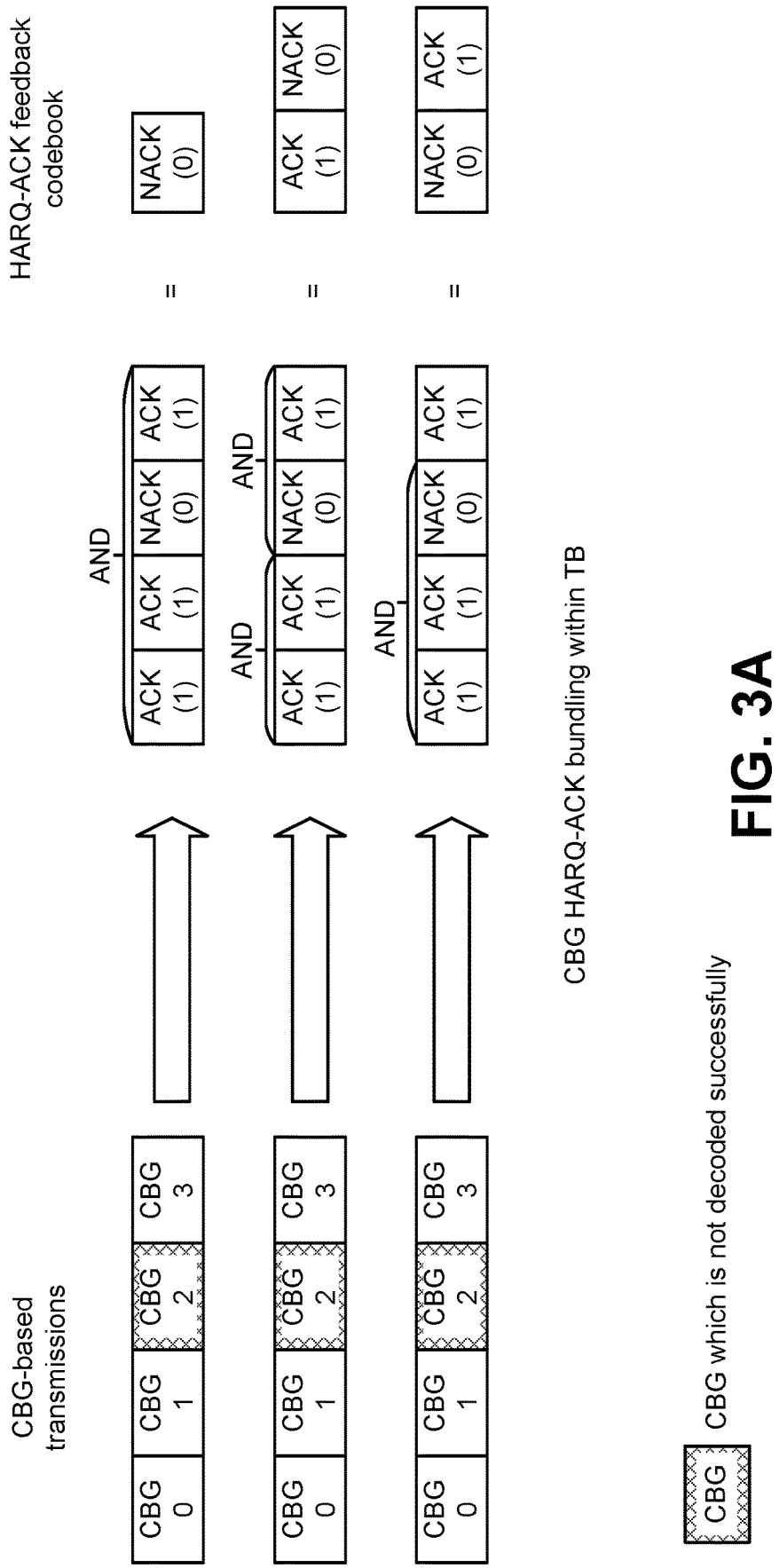

FIG. 3A illustrates CBG HARQ-ACK bundling within a TB. As illustrated, any CBG HARQ-ACK information bits within a TB may be combined by AND operation.

Figure 3B:
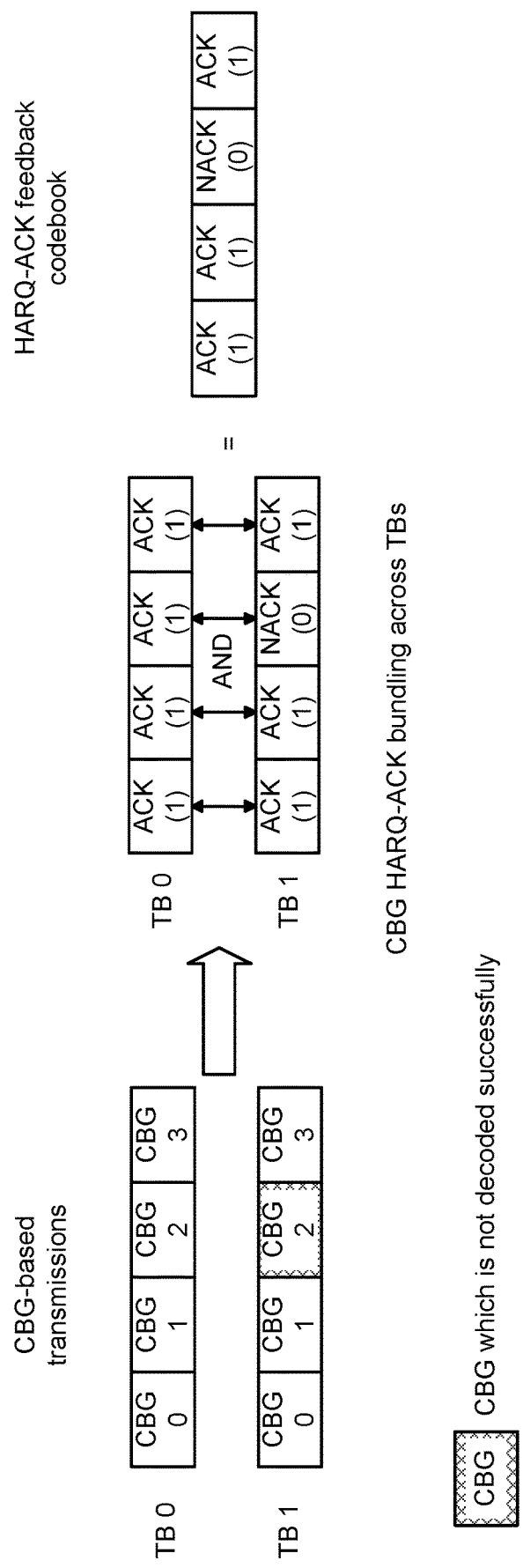

FIG. 3B illustrates CBG HARQ-ACK bundling across TBs. As illustrated, a CBG HARQ-ACK information bit of a TB can be combined with a CBG HARQ-ACK information bit of another TB.

FIG. 3C illustrates CBG HARQ-ACK bundling within a TB. In this example, ACK is mapped to an empty CBG index when the number of CBGs (e.g., 3) is less than the configured maximum number (e.g., 4).

Figure 3D:
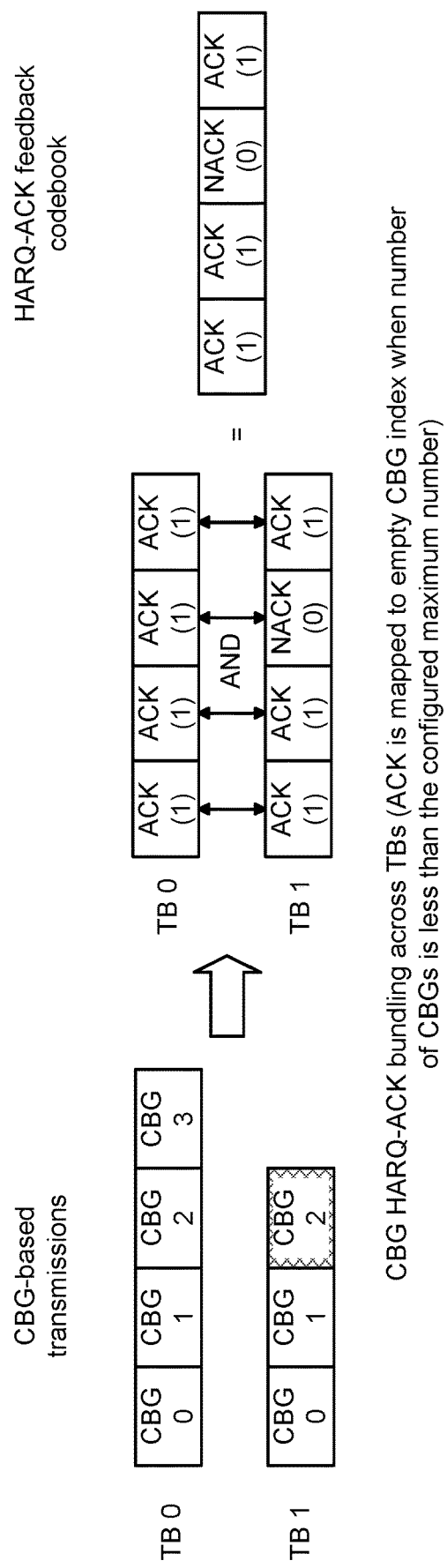

FIG. 3D illustrates CBG HARQ-ACK bundling across TBs. In this example, ACK is mapped to an empty CBG index when the number of CBGs (e.g., 3) is less than the configured maximum number (e.g., 4).

FIGS. 4A-4E illustrate examples of CBG HARQ-ACK feedback for TBs in different layers (e.g., spatial domain). In these examples, CBG transmissions at Slot n are depicted with a corresponding HARQ-ACK feedback at slot n+k.

Figure 4A:
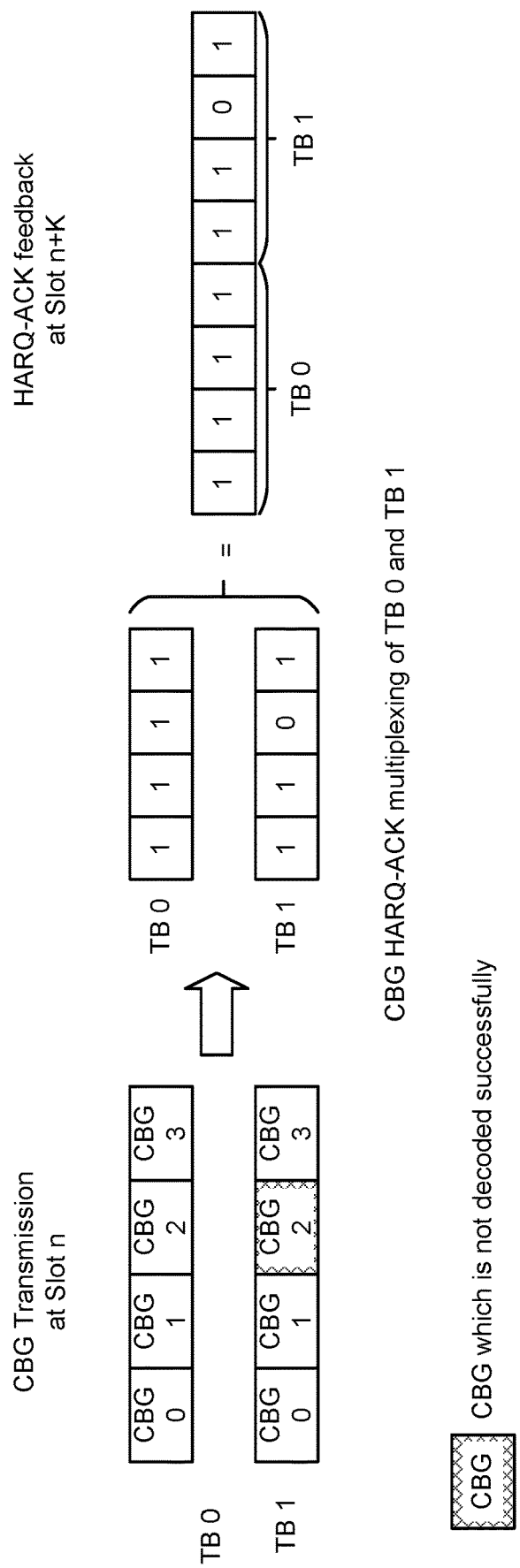
FIGS. 4A-4E illustrate examples of CBG HARQ-ACK feedback for TBs in different layers.

FIG. 4A illustrates CBG HARQ-ACK multiplexing of TB 0 and TB 1.

Figure 4B:
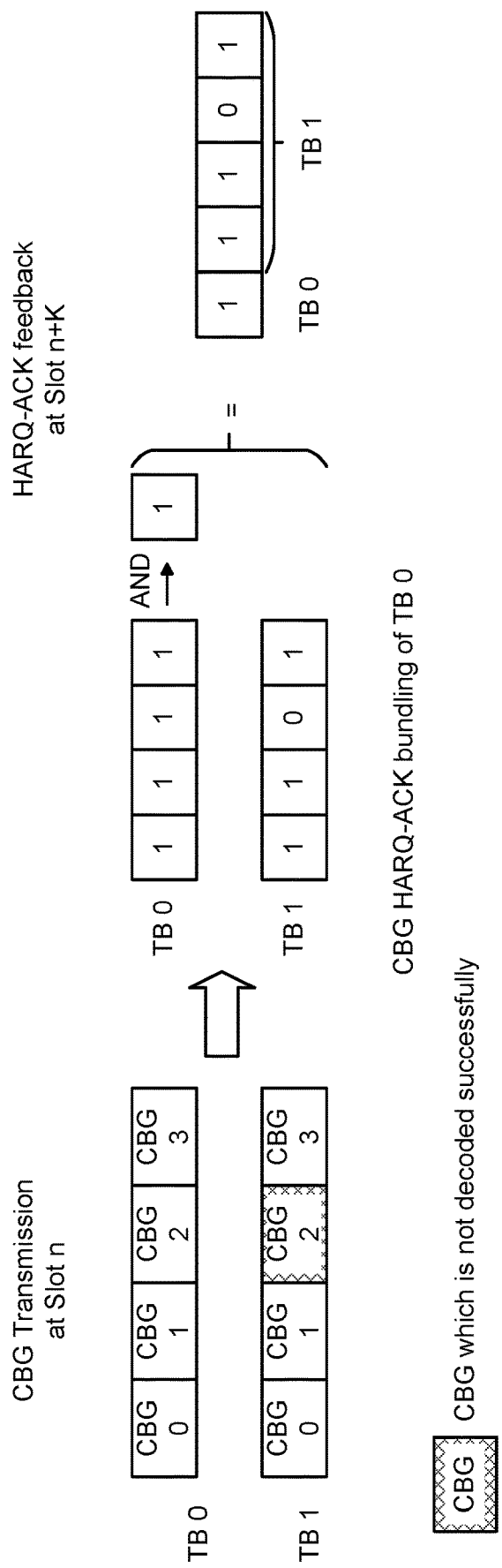

FIG. 4B illustrates CBG HARQ-ACK bundling of TB 0.

Figure 4C:
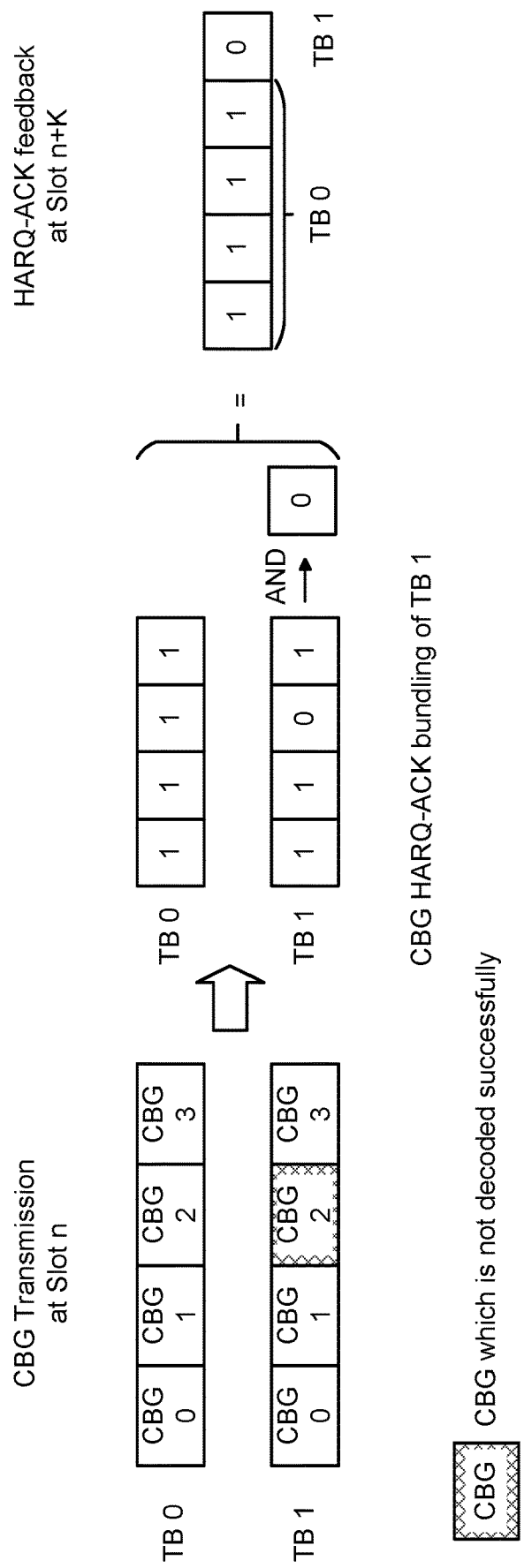

FIG. 4C illustrates CBG HARQ-ACK bundling of TB 1.

Figure 4D:
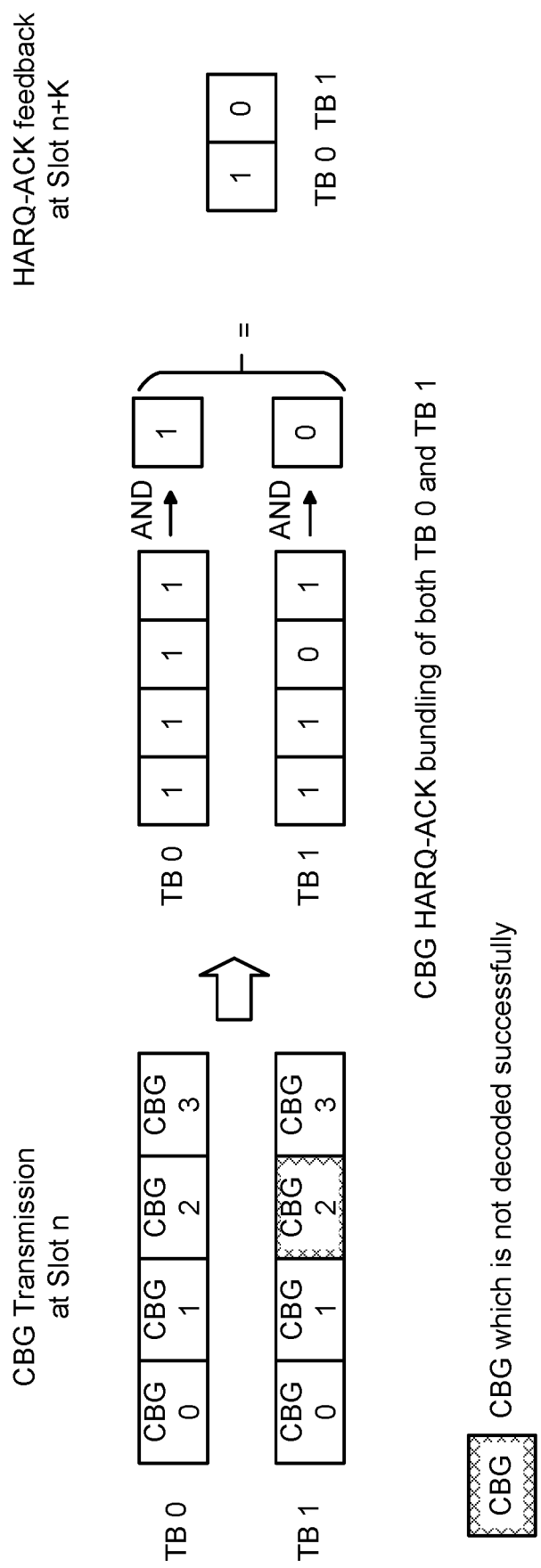

FIG. 4D illustrates CBG HARQ-ACK bundling of both TB0 and TB 1.

Figure 4E:
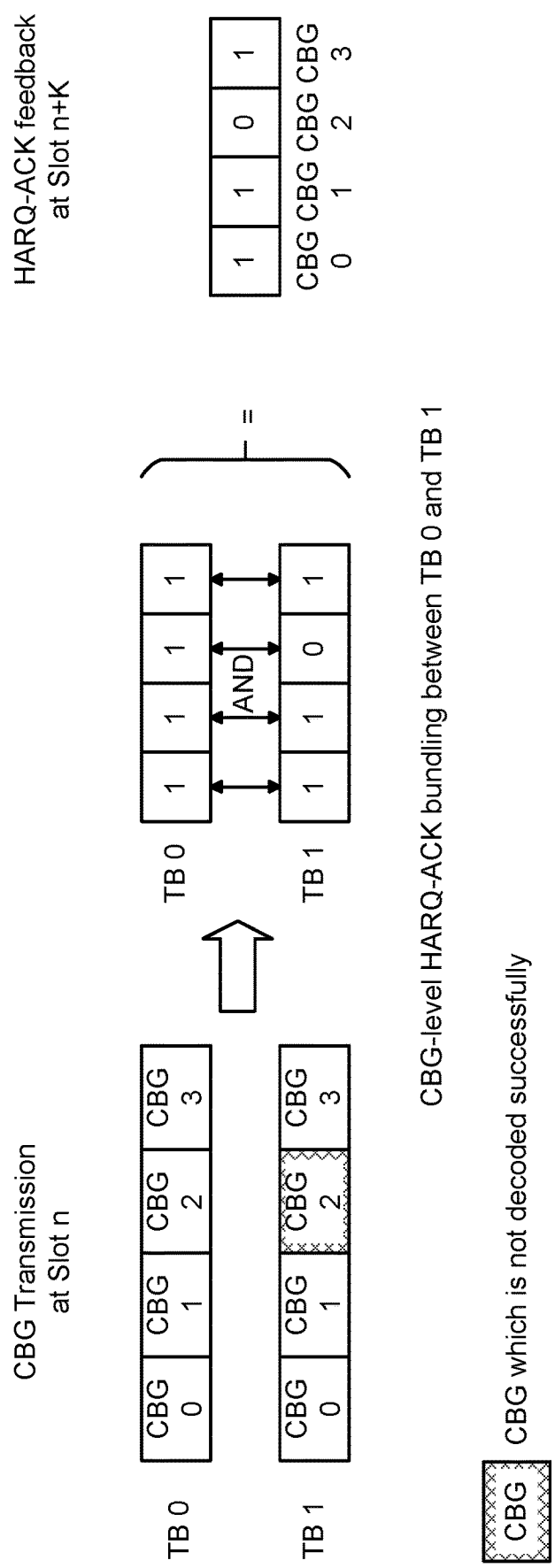

FIG. 4E illustrates CBG-level HARQ-ACK bundling between TB 0 and TB 1.

FIGS. 5A-5E illustrate examples of CBG HARQ-ACK feedback for TBs in different component carriers (e.g., serving cells). In these examples, CBG transmissions at Slot n are depicted with a corresponding HARQ-ACK feedback at slot n+k.

Figure 5A:
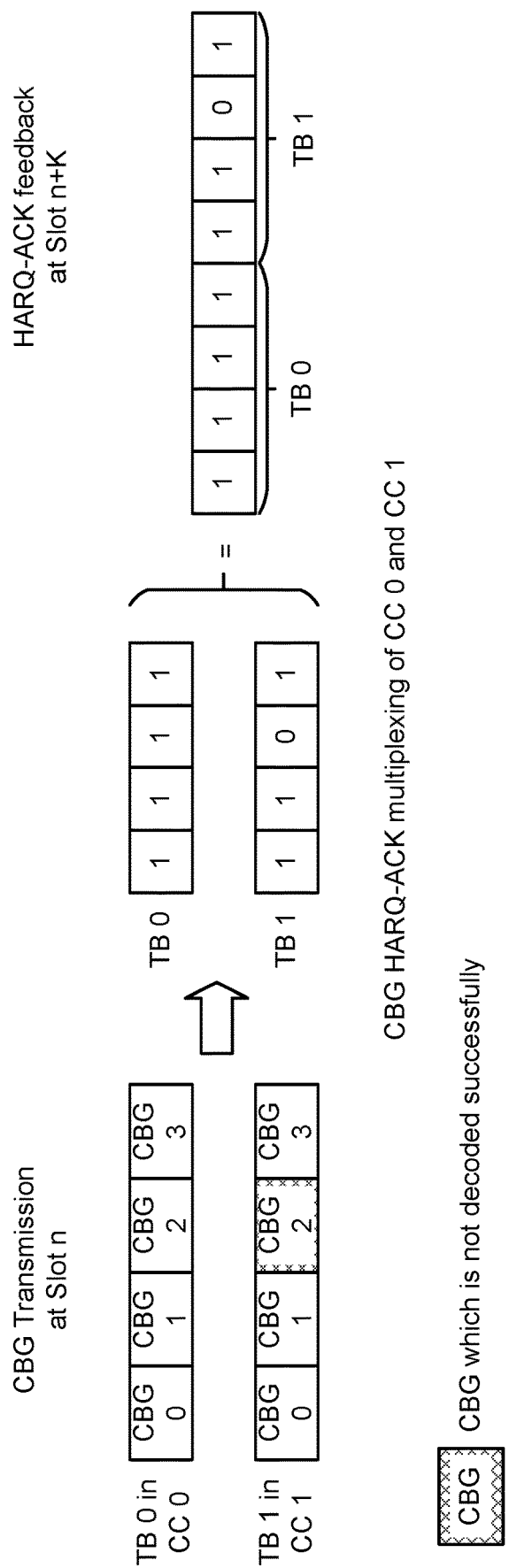
FIGS. 5A-5E illustrate examples of CBG HARQ-ACK feedback for TBs in different component carriers.

FIG. 5A illustrates CBG HARQ-ACK multiplexing of component carrier (CC) 0 and CC 1.

Figure 5B:
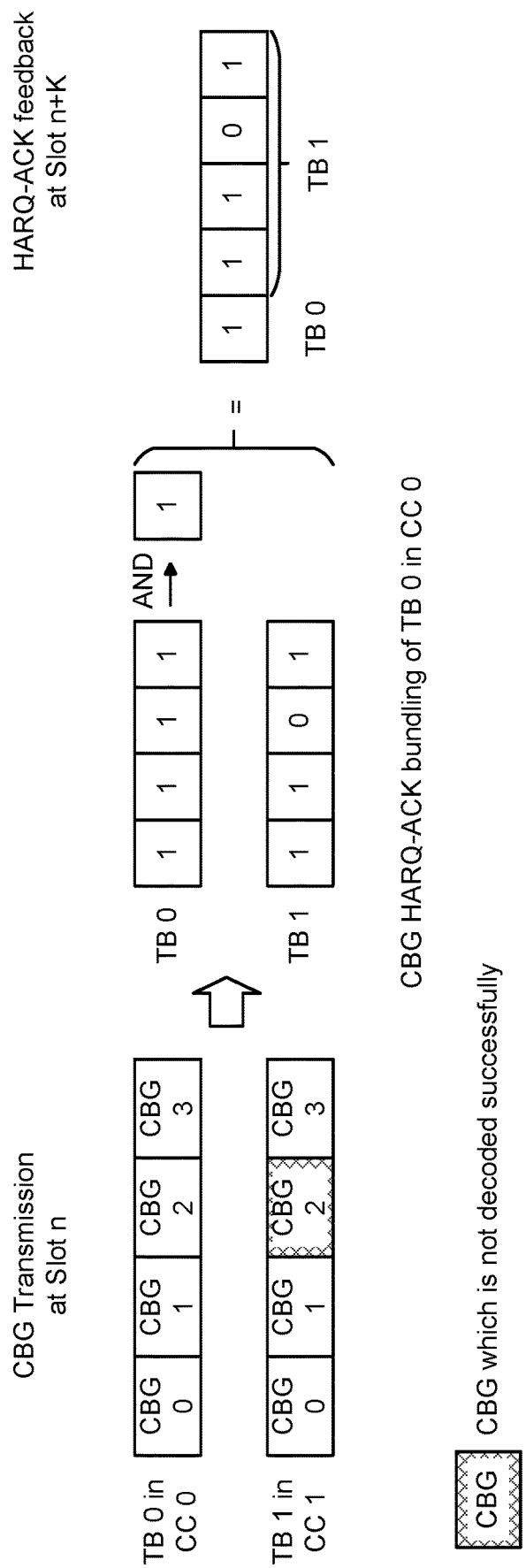

FIG. 5B illustrates CBG HARQ-ACK bundling of TB 0 in CC0.

Figure 5C:
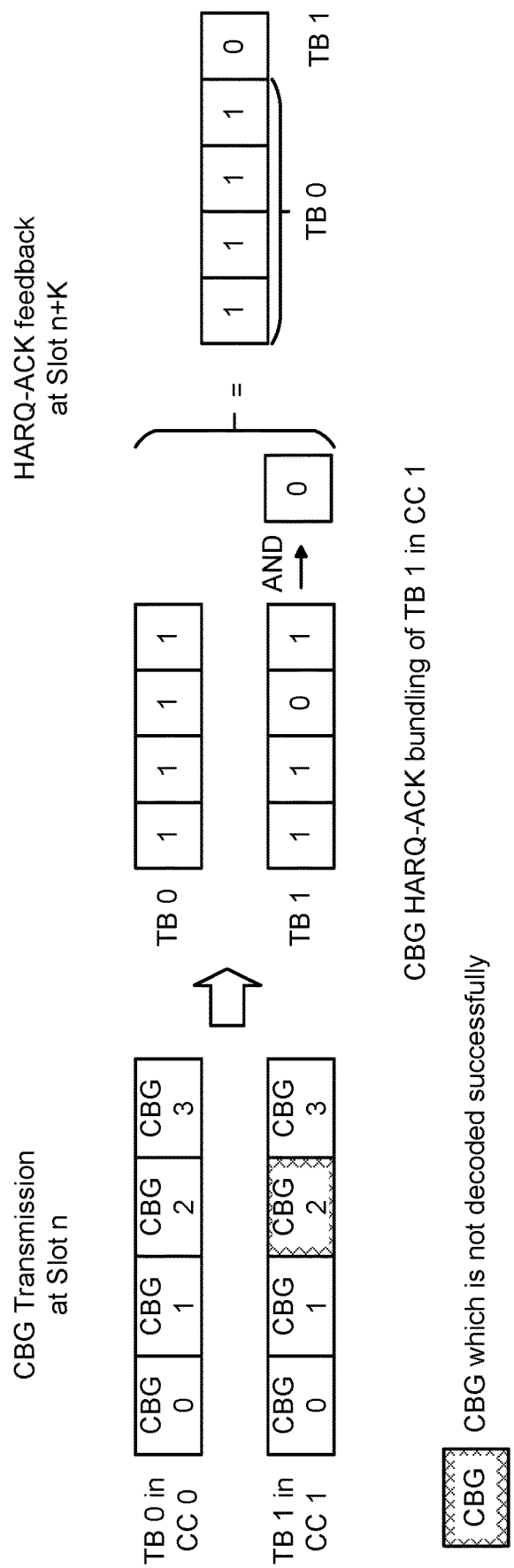

FIG. 5C illustrates CBG HARQ-ACK bundling of TB 1 in CC 1.

Figure 5D:
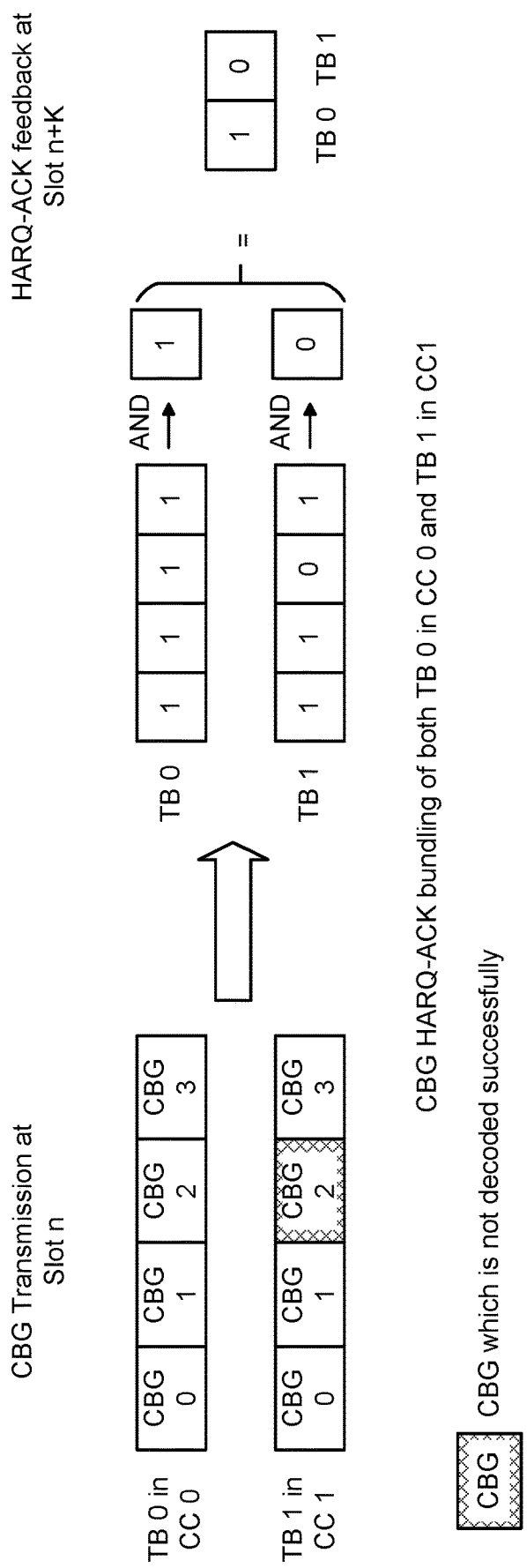

FIG. 5D illustrates CBG HARQ-ACK bundling of both TB 0 in CC 0 and TB 1 in CC 1.

Figure 5E:
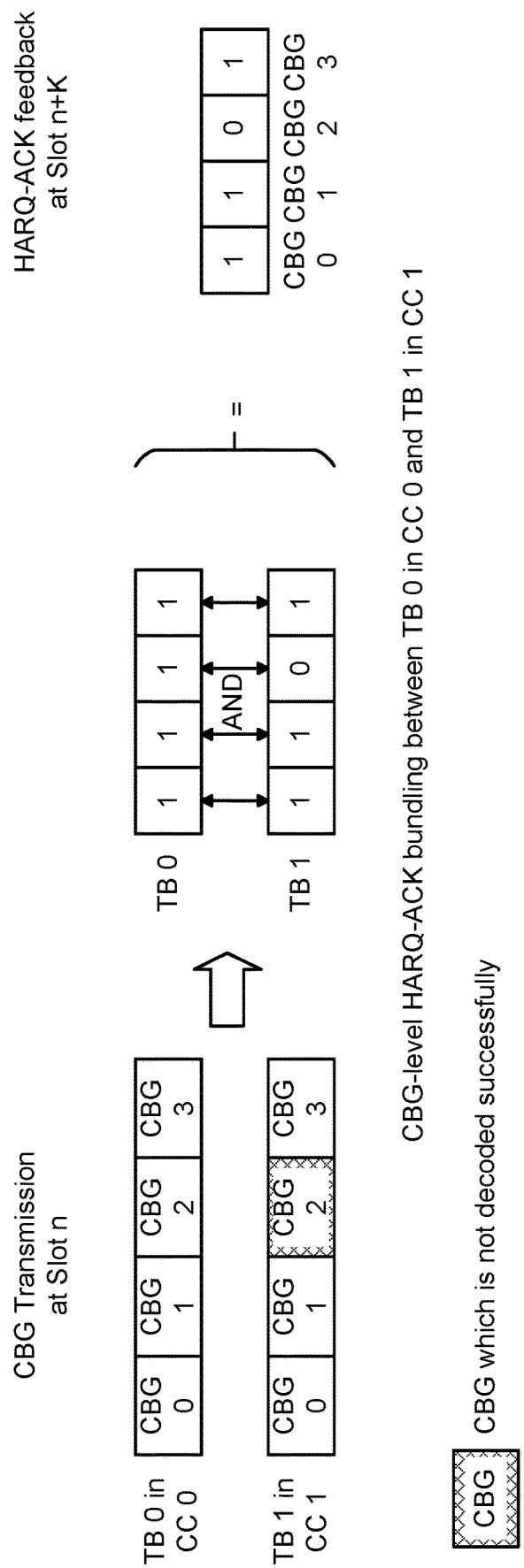

FIG. 5E illustrates CBG-level HARQ-ACK bundling between TB 0 in CC 0 and TB 1 in CC 1.

FIGS. 6A-6E illustrate examples of CBG HARQ-ACK feedback for TBs in different bandwidth parts. In these examples, CBG transmissions at Slot n are depicted with a corresponding HARQ-ACK feedback at slot n+k.

Figure 6A:
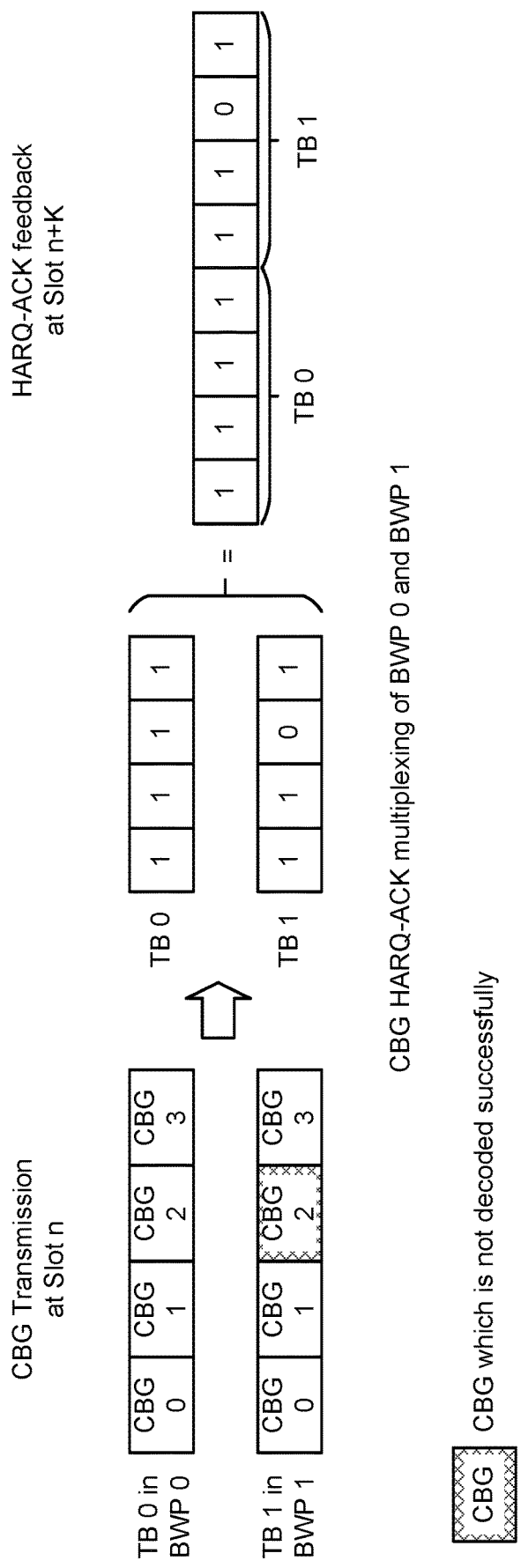
FIGS. 6A-6E illustrate examples of CBG HARQ-ACK feedback for TBs in different bandwidth parts.

FIG. 6A illustrates CBG HARQ-ACK multiplexing of bandwidth part (BWP) 0 and BWP 1.

Figure 6B:
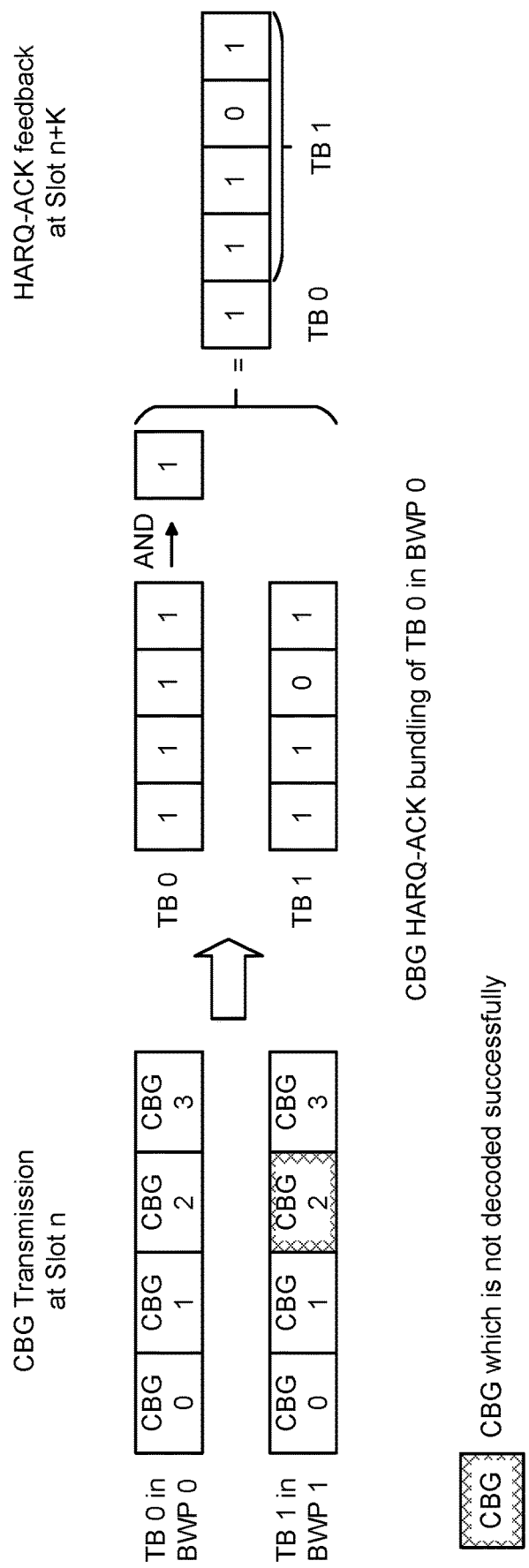

FIG. 6B illustrates CBG HARQ-ACK bundling of TB 0 in BWP 0.

Figure 6C:
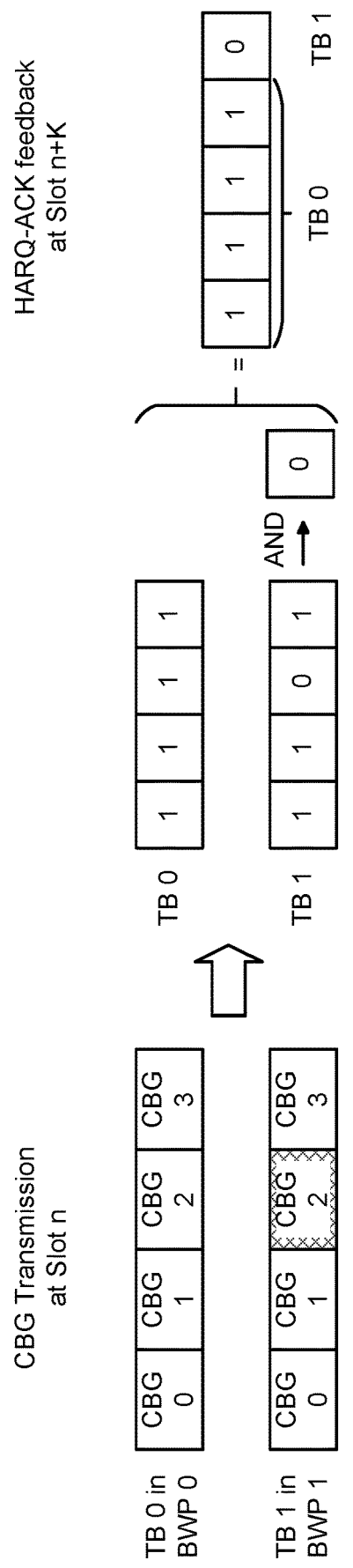

FIG. 6C illustrates CBG HARQ-ACK bundling of TB 1 in BWP 1.

Figure 6D:
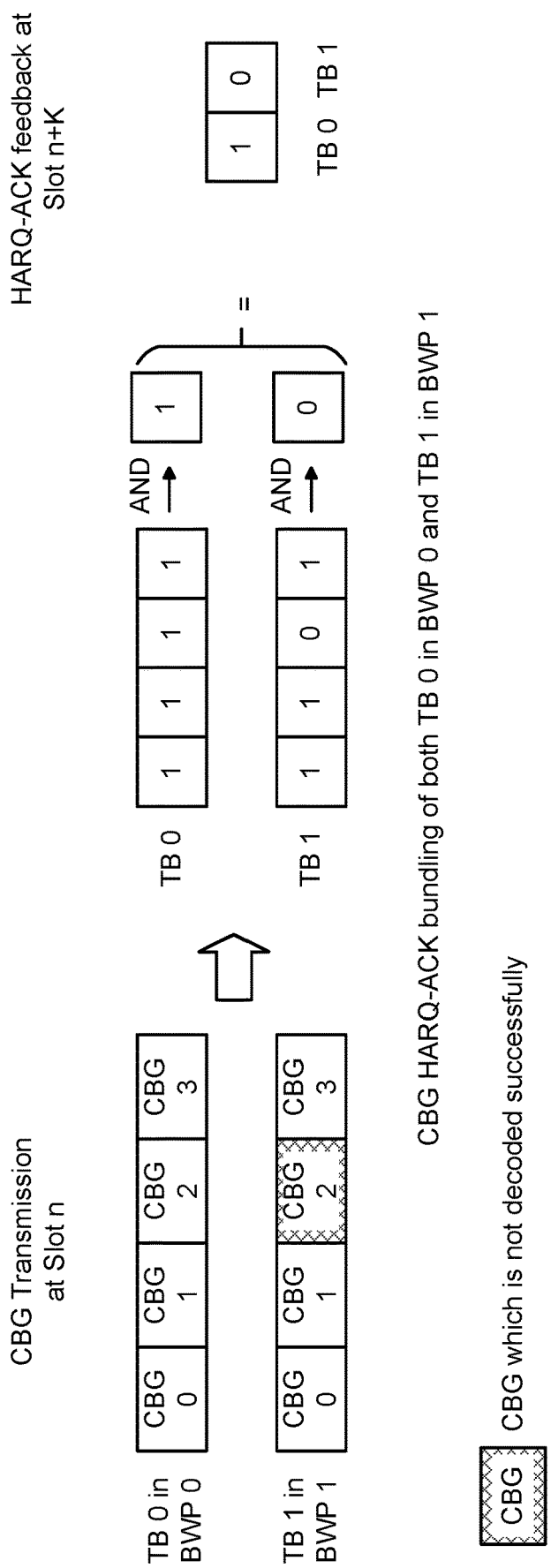

FIG. 6D illustrates CBG HARQ-ACK bundling of both TB 0 in BWP 0 and TB 1 in BWP 1.

Figure 6E:
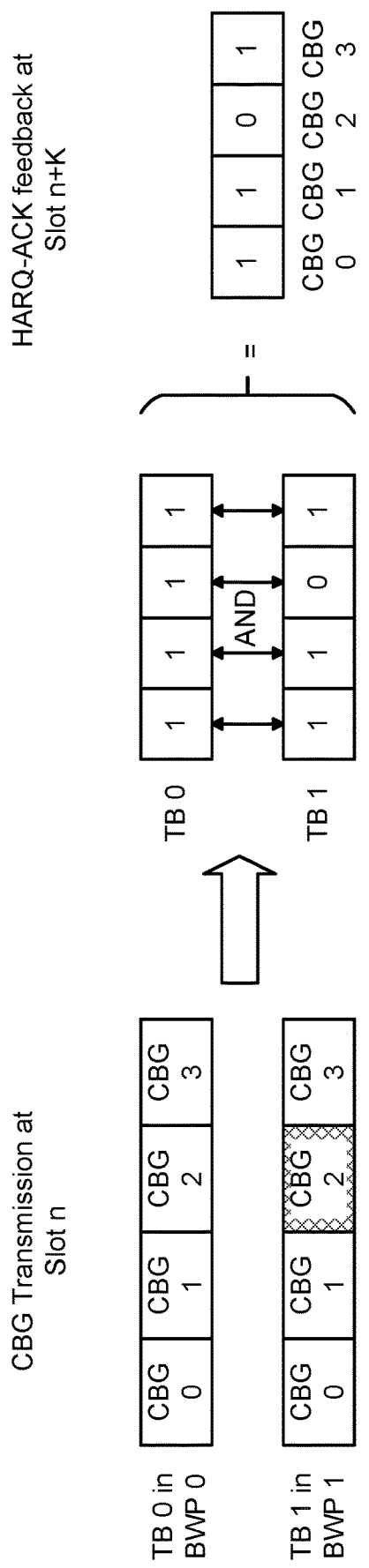

FIG. 6E illustrates CBG-level HARQ-ACK bundling between TB 0 in BWP 0 and TB 1 in BWP 1.

FIGS. 7A-7E illustrate examples of CBG HARQ-ACK feedback for at different slots. In these examples, CBG transmissions of TB 0 at slot n and TB 1 at slot n+1 are depicted with a corresponding HARQ-ACK feedback at slot n+k.

Figure 7A:
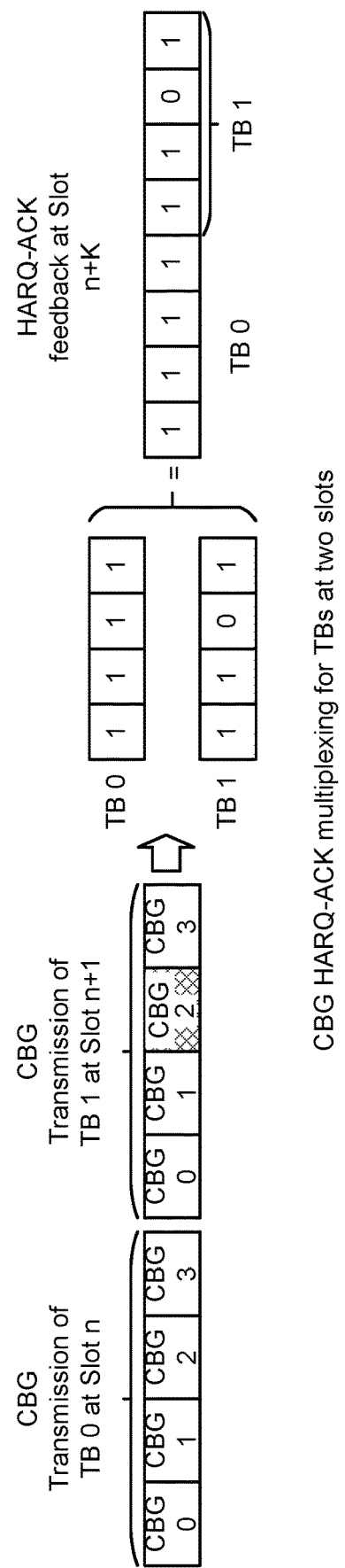
FIGS. 7A-7E illustrate examples of CBG HARQ-ACK feedback for at different slots.

FIG. 7A illustrates CBG HARQ-ACK multiplexing for TBs at two slots.

Figure 7B:
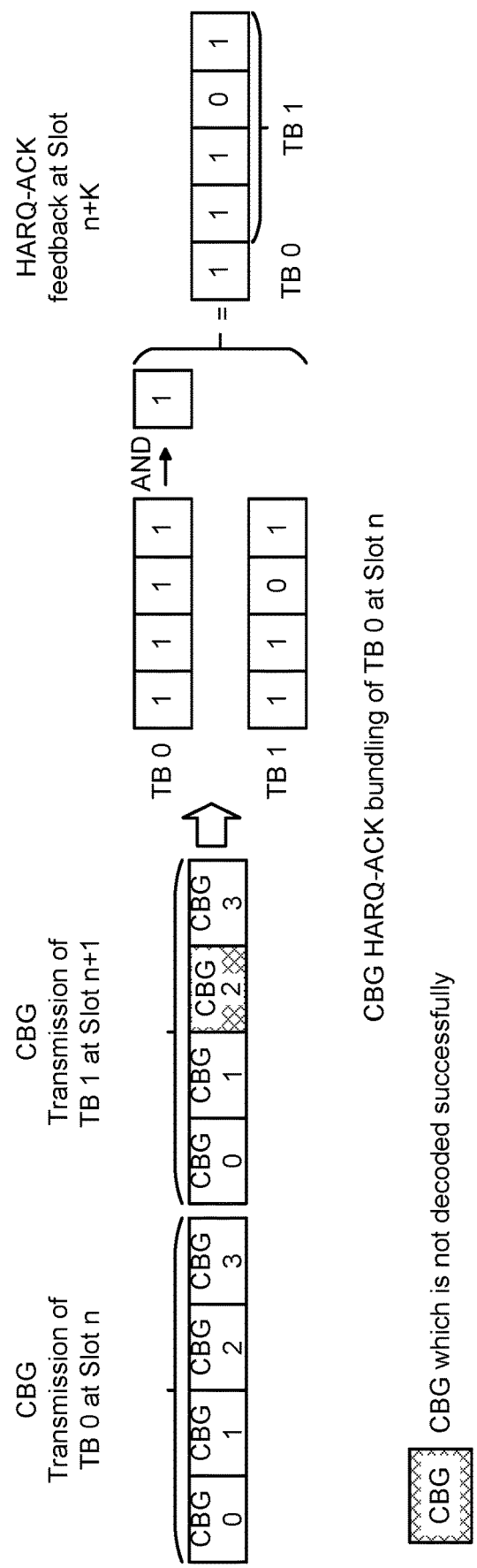

FIG. 7B illustrates CBG HARQ-ACK bundling of TB 0 at slot n.

Figure 7C:
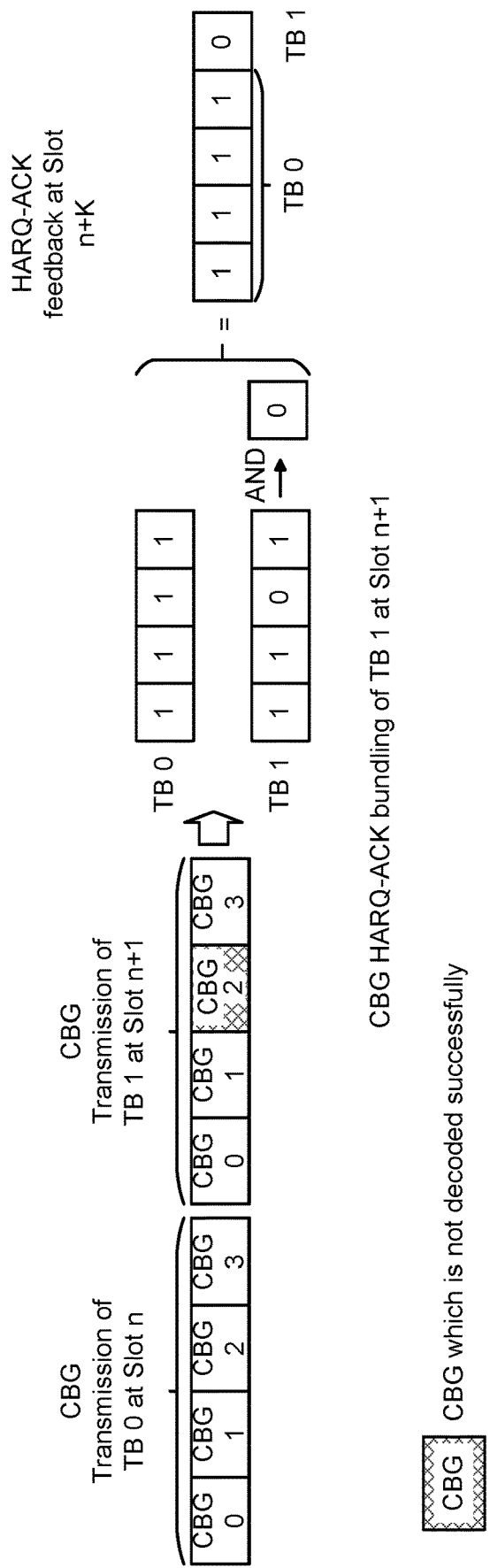

FIG. 7C illustrates CBG HARQ-ACK bundling of TB 1 at slot n+1.

Figure 7D:
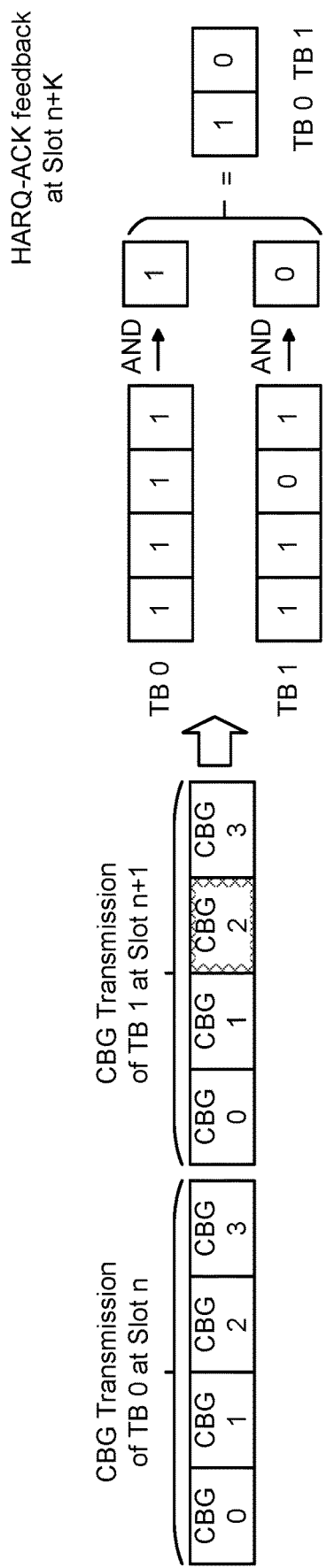

FIG. 7D illustrates CBG HARQ-ACK bundling of both TB 0 at slot n and TB 1 at slot n+1.

Figure 7E:
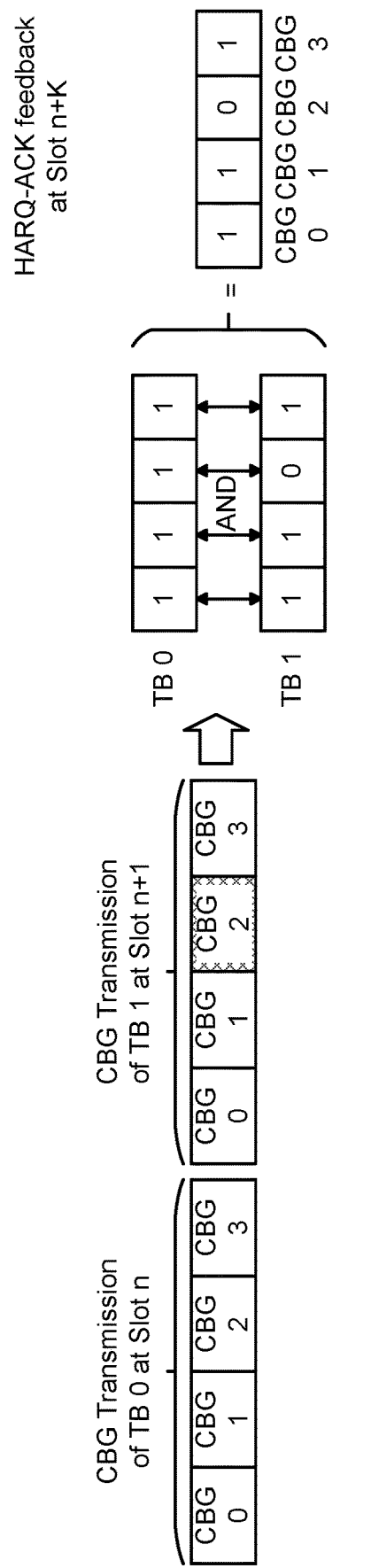

FIG. 7E illustrates CBG-level HARQ-ACK bundling between TB 0 at slot n and TB 1 at slot n+1.

The examples above may be extended to multiple (e.g., more than 2) TBs, and/or applied to TBs, CCs, BWPs, slots, mini-slots using different index.

Figure 8:
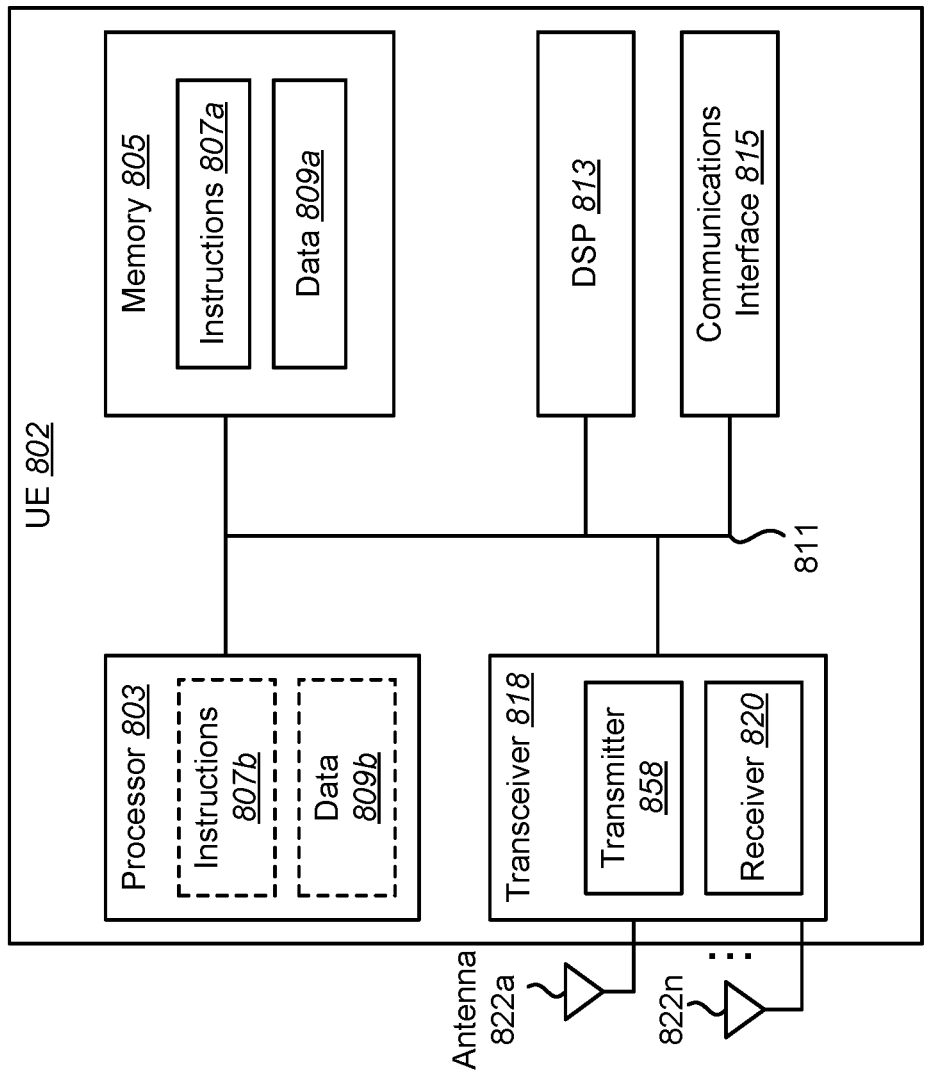
FIG. 8 illustrates various components that may be utilized in a UE.

FIG. 8 illustrates various components that may be utilized in a UE 802. The UE 802 described in connection with FIG. 8 may be implemented in accordance with the UE 102 described in connection with FIG. 1. The UE 802 includes a processor 803 that controls operation of the UE 802. The processor 803 may also be referred to as a central processing unit (CPU). Memory 805, which may include read-only memory (ROM), random access memory (RAM), a combination of the two or any type of device that may store information, provides instructions 807a and data 809a to the processor 803. A portion of the memory 805 may also include non-volatile random access memory (NVRAM). Instructions 807b and data 809b may also reside in the processor 803. Instructions 807b and/or data 809b loaded into the processor 803 may also include instructions 807a and/or data 809a from memory 805 that were loaded for execution or processing by the processor 803. The instructions 807b may be executed by the processor 803 to implement the methods described above.

The UE 802 may also include a housing that contains one or more transmitters 858 and one or more receivers 820 to allow transmission and reception of data. The transmitter(s) 858 and receiver(s) 820 may be combined into one or more transceivers 818. One or more antennas 822a-n are attached to the housing and electrically coupled to the transceiver 818.

The various components of the UE 802 are coupled together by a bus system 811, which may include a power bus, a control signal bus and a status signal bus, in addition to a data bus. However, for the sake of clarity, the various buses are illustrated in FIG. 8 as the bus system 811. The UE 802 may also include a digital signal processor (DSP) 813 for use in processing signals. The UE 802 may also include a communications interface 815 that provides user access to the functions of the UE 802. The UE 802 illustrated in FIG. 8 is a functional block diagram rather than a listing of specific components.

Figure 9:
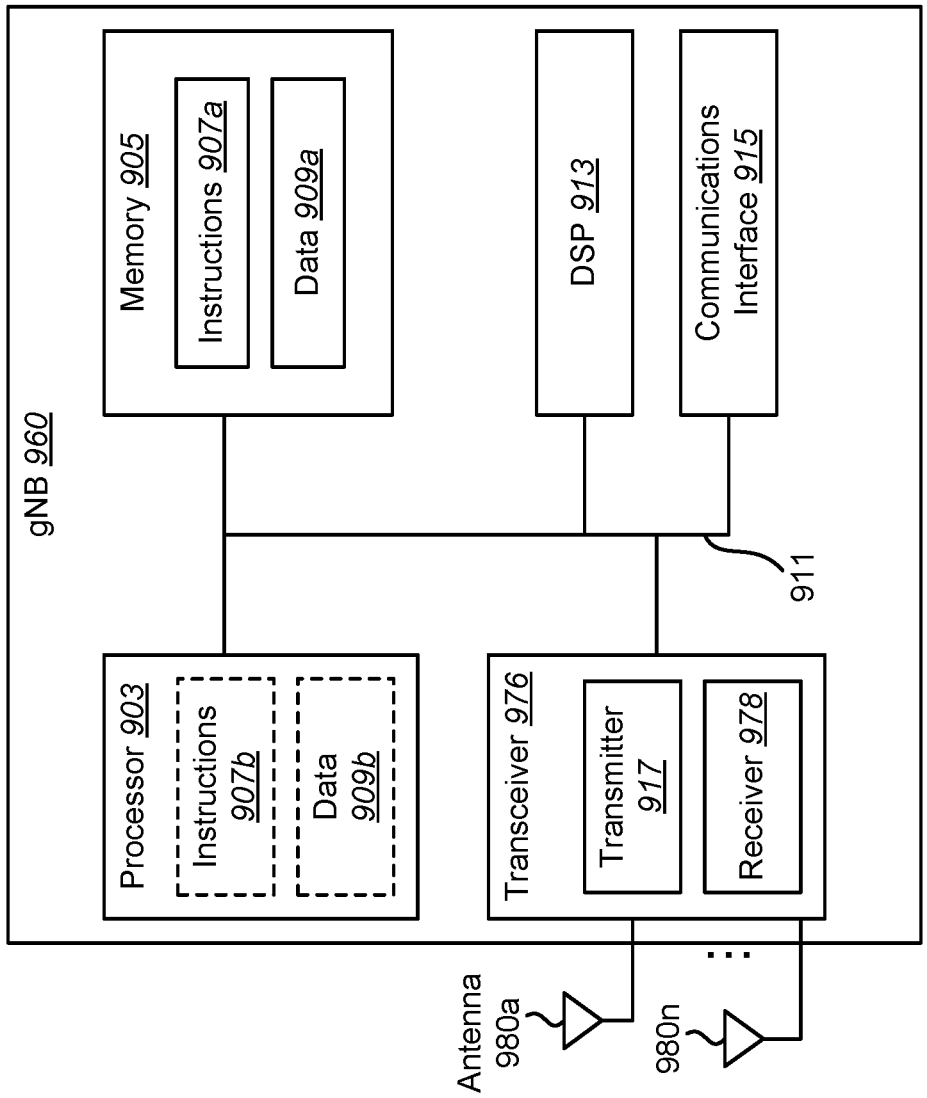
FIG. 9 illustrates various components that may be utilized in a gNB.

FIG. 9 illustrates various components that may be utilized in a gNB 960. The gNB 960 described in connection with FIG. 9 may be implemented in accordance with the gNB 160 described in connection with FIG. 1. The gNB 960 includes a processor 903 that controls operation of the gNB 960. The processor 903 may also be referred to as a central processing unit (CPU). Memory 905, which may include read-only memory (ROM), random access memory (RAM), a combination of the two or any type of device that may store information, provides instructions 907a and data 909a to the processor 903. A portion of the memory 905 may also include non-volatile random access memory (NVRAM). Instructions 907b and data 909b may also reside in the processor 903. Instructions 907b and/or data 909b loaded into the processor 903 may also include instructions 907a and/or data 909a from memory 905 that were loaded for execution or processing by the processor 903. The instructions 907b may be executed by the processor 903 to implement the methods described above.

The gNB 960 may also include a housing that contains one or more transmitters 917 and one or more receivers 978 to allow transmission and reception of data. The transmitter(s) 917 and receiver(s) 978 may be combined into one or more transceivers 976. One or more antennas 980a-n are attached to the housing and electrically coupled to the transceiver 976.

The various components of the gNB 960 are coupled together by a bus system 911, which may include a power bus, a control signal bus and a status signal bus, in addition to a data bus. However, for the sake of clarity, the various buses are illustrated in FIG. 9 as the bus system 911. The gNB 960 may also include a digital signal processor (DSP) 913 for use in processing signals. The gNB 960 may also include a communications interface 915 that provides user access to the functions of the gNB 960. The gNB 960 illustrated in FIG. 9 is a functional block diagram rather than a listing of specific components.

Figure 10:
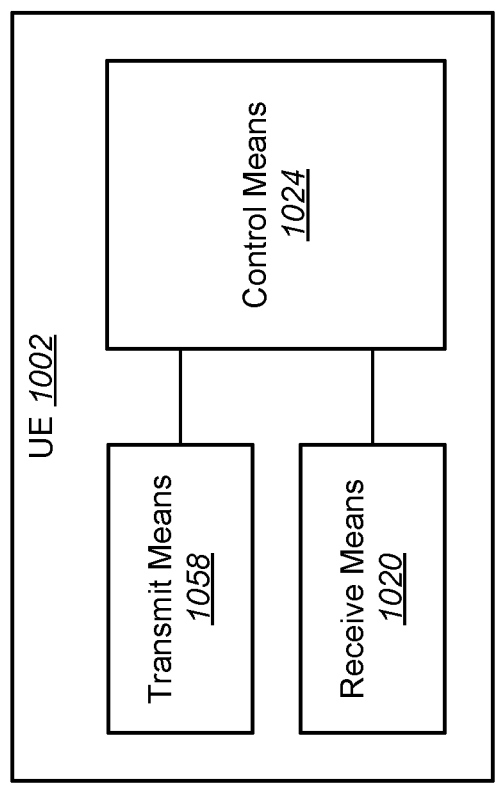
FIG. 10 is a block diagram illustrating one implementation of a UE in which systems and methods for CBG-based HARQ-ACK processes may be implemented.

FIG. 10 is a block diagram illustrating one implementation of a UE 1002 in which systems and methods for CBG-based HARQ-ACK processes may be implemented. The UE 1002 includes transmit means 1058, receive means 1020 and control means 1024. The transmit means 1058, receive means 1020 and control means 1024 may be configured to perform one or more of the functions described in connection with FIG. 1 above. FIG. 8 above illustrates one example of a concrete apparatus structure of FIG. 10. Other various structures may be implemented to realize one or more of the functions of FIG. 1. For example, a DSP may be realized by software.

Figure 11:
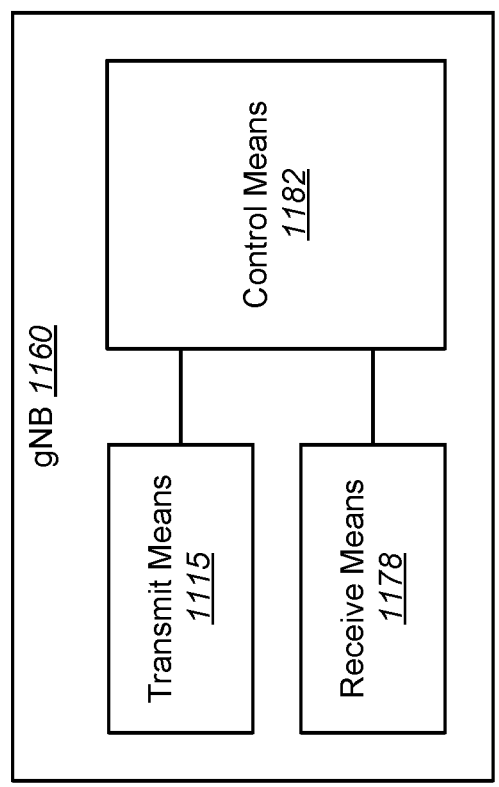
FIG. 11 is a block diagram illustrating one implementation of a gNB in which systems and methods for CBG-based HARQ-ACK processes may be implemented.

FIG. 11 is a block diagram illustrating one implementation of a gNB 1160 in which systems and methods for CBG-based HARQ-ACK processes may be implemented. The gNB 1160 includes transmit means 1117, receive means 1178 and control means 1182. The transmit means 1117, receive means 1178 and control means 1182 may be configured to perform one or more of the functions described in connection with FIG. 1 above. FIG. 9 above illustrates one example of a concrete apparatus structure of FIG. 11. Other various structures may be implemented to realize one or more of the functions of FIG. 1. For example, a DSP may be realized by software.

It should be noted that names of physical channels described herein are examples. The other names such as "NRPDCCH, NRPDSCH, NRPUCCH and NRPUSCH," "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD and the like), a magnetic storage medium (for example, a magnetic tape, a flexible disk and the like) and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment comprising:
a processor; and
memory in electronic communication with the processor, wherein instructions stored in the memory are executable to:
receive a Radio Resource Control (RRC) message including first information configuring code block group (CBG) based (re)transmission and a maximum number of CBGs;
receive an RRC message including second information configuring Hybrid Automatic Repeat reQuest-Acknowledgement (HARQ-ACK) bundling for the CBGs across transport blocks (TBs);
receive, on a physical downlink control channel (PDCCH) resource, a scheduling downlink control information (DCI) message including third information configuring time-domain information, frequency-domain information, and CBG transmission information for a physical downlink shared channel (PDSCH) resource of a CBG-based transmission;
receive, on the PDSCH resource, a corresponding CBG-based transmission; and
send, on a physical uplink control channel (PUCCH) resource, a bundled HARQ-ACK information bit for a CBG index indicating whether the CBG(s) with a same index in any TBs or both TBs in the PDSCH are decoded successfully.

2. A base station apparatus comprising:
a processor; and
memory in electronic communication with the processor, wherein instructions stored in the memory are executable to:
transmit a Radio Resource Control (RRC) message including first information configuring code block group (CBG) based (re)transmission and a maximum number of CBGs;
transmit an RRC message including second information configuring Hybrid Automatic Repeat reQuest-Acknowledgement (HARQ-ACK) bundling for the CBGs across transport blocks (TBs);
transmit, on a physical downlink control channel (PDCCH) resource, a scheduling downlink control information (DCI) message, including third information configuring time-domain information, frequency-domain information, and CBG transmission information for a physical downlink shared channel (PDSCH) resource of a CBG-based transmission;

transmit, on the PDSCH resource, a corresponding CBG-based transmission; and receive, on a physical uplink control channel (PUCCH) resource, a bundled HARQ-ACK information bit for a CBG index indicating whether the CBG(s) with a same index in any TBs or both TBs in the PDSCH are decoded successfully.

* * * * *